US012795559B2

(12) United States Patent
Liu et al.

(10) Patent No.: US 12,795,559 B2
(45) Date of Patent: Nov. 10, 2026

(54) RADIO-FREQUENCY-EXPOSURE-AWARE MOBILE NTN COMMUNICATIONS

(71) Applicant: QUALCOMM Incorporated, San Diego, CA (US)

(72) Inventors: Tienyow Liu, Santa Clara, CA (US); Udayan Bhawnani, San Diego, CA (US); Farhad Meshkati, San Diego, CA (US); Nathan Yee, Saratoga, CA (US); Carl Hardin, Encinitas, CA (US); Troy Curtiss, Boulder, CO (US); Akhil Deodhar, Louisville, CO (US)

(73) Assignee: QUALCOMM Incorporated, San Diego, CA (US)

( * ) Notice: Subject to any disclaimer, the term of this patent is extended or adjusted under 35 U.S.C. 154(b) by 360 days.

(21) Appl. No.: 18/354,367

(22) Filed: Jul. 18, 2023

(65) Prior Publication Data

US 2025/0031156 A1 Jan. 23, 2025

(51) Int. Cl.
*H04W 52/36* (2009.01)
*H04B 17/23* (2015.01)
*H04W 84/06* (2009.01)

(52) U.S. Cl.
CPC .......... *H04W 52/367* (2013.01); *H04B 17/23* (2015.01); *H04W 84/06* (2013.01)

(58) Field of Classification Search
CPC ..... H04W 52/367; H04W 84/06; H04B 17/23
See application file for complete search history.

(56) References Cited

U.S. PATENT DOCUMENTS

| | | | | |
|---|---|---|---|---|
| 11,184,866 | B2 * | 11/2021 | Cai | H04W 52/42 |
| 12,041,554 | B2 * | 7/2024 | Shi | H04W 24/10 |
| 12,167,342 | B2 * | 12/2024 | Hakola | H04W 52/367 |
| 2017/0353697 | A1 * | 12/2017 | Murakami | H04W 84/005 |
| 2021/0204356 | A1 | 7/2021 | Sakai | |
| 2022/0159581 | A1 | 5/2022 | Lu et al. | |
| 2022/0159582 | A1 * | 5/2022 | Lu | H04W 52/36 |
| 2022/0191730 | A1 * | 6/2022 | Meylan | H04W 28/0268 |
| 2022/0256473 | A1 * | 8/2022 | Kiilerich Pratas | H04B 17/318 |
| 2022/0264481 | A1 * | 8/2022 | Caporal Del Barrio | H04W 52/367 |
| 2023/0041095 | A1 * | 2/2023 | Zhou | H04L 5/0057 |
| 2024/0022278 | A1 * | 1/2024 | Zhou | H04B 1/3838 |
| 2024/0155509 | A1 * | 5/2024 | Cozzo | H04W 52/367 |
| 2024/0306098 | A1 * | 9/2024 | MolavianJazi | H04W 52/365 |

OTHER PUBLICATIONS

International Search Report and Written Opinion—PCT/US2024/034064—ISA/EPO—Oct. 11, 2024.

* cited by examiner

*Primary Examiner* — Shah M Rahman
(74) *Attorney, Agent, or Firm* — Patterson & Sheridan LLP/Qualcomm

(57) ABSTRACT

Certain aspects of the present disclosure provide techniques and apparatus for a mobile satellite communications application that is aware of radio frequency (RF) exposure. An example method of wireless communication by a wireless device includes determining an RF exposure budget for one or more future transmissions in compliance with an RF exposure limit. The method further includes obtaining a size of a payload for a potential transmission. The method further includes determining transmission information based at least in part on the RF exposure budget and the size of the payload. The method further includes outputting the transmission information for a user of the wireless device.

30 Claims, 9 Drawing Sheets

RADIO-FREQUENCY-EXPOSURE-AWARE MOBILE NTN COMMUNICATIONS

INTRODUCTION

Field of the Disclosure

Aspects of the present disclosure relate to wireless communications, and more particularly, to radio frequency (RF) exposure compliance.

DESCRIPTION OF RELATED ART

Wireless communication systems are widely deployed to provide various telecommunication services such as telephony, video, data, messaging, broadcasts, etc. Modern wireless communication devices (such as cellular telephones) are generally mandated to meet radio frequency (RF) exposure limits set by certain governments and international standards and regulations. To ensure compliance with the standards, such devices may undergo an extensive certification process prior to being shipped to market. To ensure that a wireless communication device complies with an RF exposure limit, techniques have been developed to enable the wireless communication device to assess RF exposure from the wireless communication device and adjust the transmit power of the wireless communication device accordingly to comply with the RF exposure limit.

SUMMARY

Some aspects provide a method of wireless communication by a wireless device. The method includes determining a radio frequency (RF) exposure budget for one or more future transmissions in compliance with an RF exposure limit. The method further includes obtaining a size of a payload for a potential transmission. The method further includes determining transmission information based at least in part on the RF exposure budget and the size of the payload. The method further includes outputting the transmission information to a user of the wireless device.

Some aspects provide an apparatus for wireless communication. The apparatus includes a memory and one or more processors coupled to the memory. The one or more processors are configured to determine an RF exposure budget for one or more future transmissions in compliance with an RF exposure limit, obtain a size of a payload for a potential transmission, determine transmission information based at least in part on the RF exposure budget and the size of the payload, and output the transmission information for a user of the apparatus.

Some aspects provide an apparatus for wireless communication. The apparatus includes means for determining an RF exposure budget for one or more future transmissions in compliance with an RF exposure limit; means for obtaining a size of a payload for a potential transmission; means for determining transmission information based at least in part on the RF exposure budget and the size of the payload; and means for outputting the transmission information for a user of the wireless device.

Some aspects provide a non-transitory computer-readable medium. The computer-readable medium has instructions stored thereon, that when executed by an apparatus, cause the apparatus to perform a method. The method includes determining an RF exposure budget for one or more future transmissions in compliance with an RF exposure limit. The method further includes obtaining a size of a payload for a potential transmission. The method further includes determining transmission information based at least in part on the RF exposure budget and the size of the payload. The method further includes outputting the transmission information for a user of the wireless device.

Other aspects provide: an apparatus operable, configured, or otherwise adapted to perform any one or more of the aforementioned methods and/or those described elsewhere herein; a non-transitory, computer-readable medium comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized in other aspects without specific recitation.

DETAILED DESCRIPTION

Figure 1:
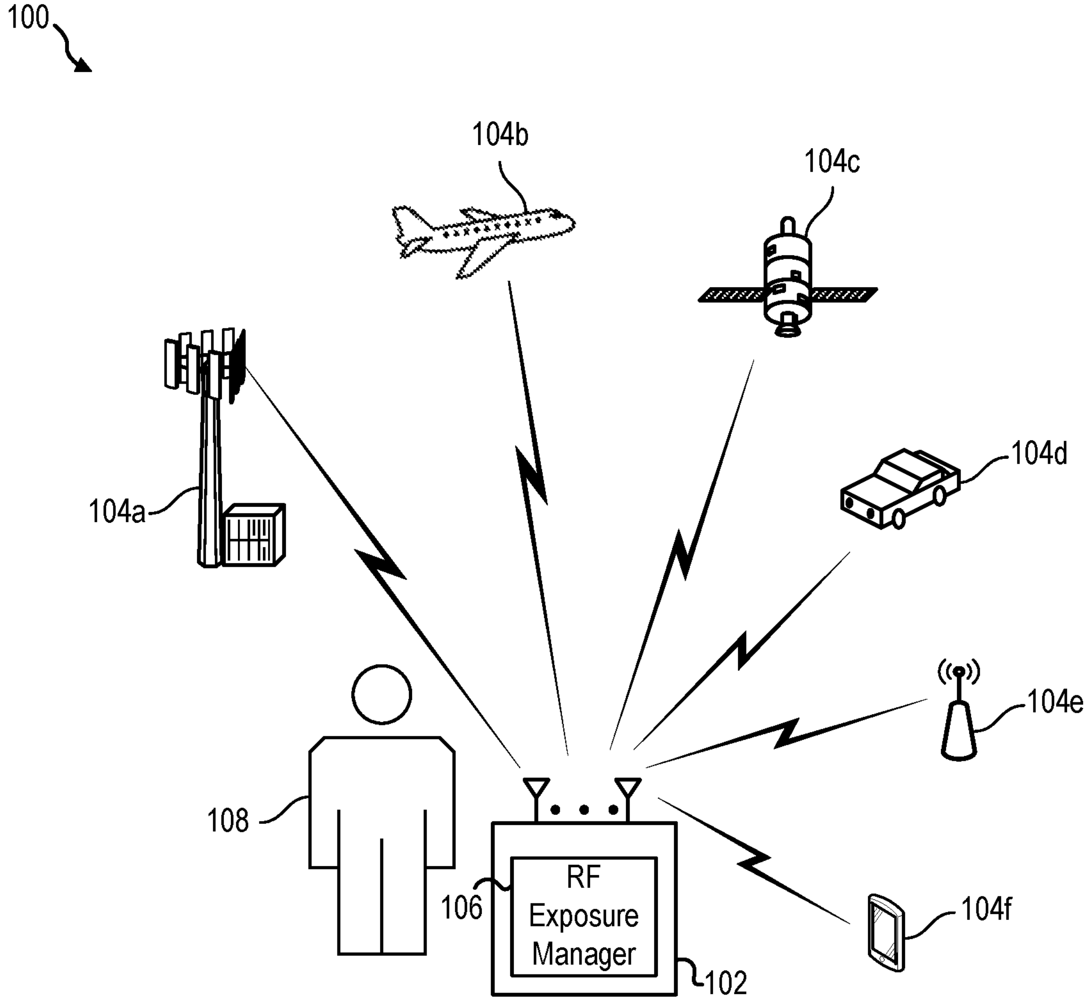
FIG. 1 is a block diagram conceptually illustrating an example wireless communication system exhibiting radio frequency (RF) exposure to a human.

Aspects of the present disclosure provide apparatus, methods, processing systems, and computer-readable mediums for enhancing non-terrestrial network (NTN) (e.g., satellite) communications with information derived from a radio frequency (RF) exposure evaluation.

As an example, for mobile satellite text messaging, the transmission of text messages from a wireless communication device to a satellite may be subject to RF exposure specifications as provided by guidelines (e.g., International Commission on Non-Ionizing Radiation Protection (ICNIRP) guidelines) and/or regulations as set by a regulator (e.g., the Federal Communications Commission (FCC) in the United States). In some cases, the wireless device may evaluate the RF exposure over a given time-averaging time window based on a past transmission history to determine a transmit power for a future time interval in compliance with a time-averaged RF exposure limit. As a transmission to a satellite uses a relatively high transmit power (e.g., a transmit power that is greater than a maximum time-averaged power level corresponding to a time-averaged RF exposure limit), the RF exposure budget may be exhausted by the transmission to the satellite, and in some cases, by a single transmission to the satellite. In some cases, the wireless device may force a user to wait before sending another text message in order to obtain enough RF exposure budget for a transmission to be in compliance with an RF exposure limit. In certain cases, the wireless device may set a character limit for the text message due to the RF exposure budget only supporting a transmission with the respective character limit in order to be in compliance with the RF exposure limit. For example, the wireless device may not allow the user to send the complete text of a text message and/or force the user to reduce the characters in the text message. Suppose, for example, the available RF exposure budget is low (e.g., enough for a short text message), and a user writes a long text message, the wireless device may transmit a partial text message and quickly exhaust RF exposure budget, forcing the user to wait until there is enough RF exposure budget to transmit the complete text message. Thus, the user experience for satellite text messaging and/or other communications that use high transmit powers (e.g., other types of non-terrestrial network (NTN) communications, transmissions at a cell's edge, etc.) may be frustrated due to the RF exposure limit.

Aspects of the present disclosure provide apparatus and methods for enhancing NTN (e.g., satellite) communications with information derived from an RF exposure evaluation. A wireless device may determine the current RF exposure budget for future transmission(s) based on transmit power(s) associated with past transmission(s) in a time-averaging time window. The RF exposure budget may indicate the maximum transmit power and/or maximum transmit duration for one or more signals that the wireless device can transmit and remain in compliance with an RF exposure limit. The wireless device may convert the RF exposure budget to information that can enhance the user experience, the information including, for example, a maximum payload size (e.g., a character limit for a potential text message transmission) and/or wait time to transmit the corresponding payload (e.g., the wait time may correspond to the seconds until a text message transmission can be sent). The wireless device may display the information in a satellite communications application to facilitate an enhanced user experience. In certain aspects, the wireless device may dynamically update the information in response to the rolling nature of the RF exposure budget and how the user adjusts the payload (e.g., increasing or decreasing the length of a text message). With the information of a character limit and/or wait time to transmit, a user may be able to choose to immediately send a shorter message or to wait to transmit a longer message per the wait time.

The apparatus and methods for enhancing NTN communications described herein may provide various advantages. As an example, the apparatus and methods described herein may provide a user with information that can allow the user to determine whether to send a short text message immediately or after a short duration or send a longer text message after a long duration. Such information, for example as displayed in a satellite communications application, may enhance the user experience for a user.

Example RF Exposure Compliance

FIG. 1 illustrates an example wireless communication system 100 in which aspects of the present disclosure may be performed. For example, the wireless communication system 100 may include a wireless wide area network (WWAN) and/or a wireless local area network (WLAN). For example, a WWAN may include a New Radio (NR) system (e.g., a 5G NR network), an Evolved Universal Terrestrial Radio Access (E-UTRA) system (e.g., a 4G network), a Universal Mobile Telecommunications System (UMTS) (e.g., a Second Generation (2G) and/or Third Generation (3G) network), a code division multiple access (CDMA) system (e.g., a 2G/3G network), any future WWAN system, or any combination thereof. A WLAN may include a wireless network configured for communications according to an Institute of Electrical and Electronics Engineers (IEEE) standard such as one or more of the 802.11 standards, etc. In some cases, the wireless communication system 100 may include a device-to-device (D2D) communications network or a short-range communications system, such as Bluetooth communications.

As illustrated in FIG. 1, the wireless communication system 100 may include a first wireless device 102 communicating with any of various second wireless devices 104*a-f* (a second wireless device 104) via any of various radio access technologies (RATs), where a wireless device may refer to a wireless communication device. The RATs may include, for example, WWAN communications (e.g., E-UTRA and/or 5G NR), WLAN communications (e.g., IEEE 802.11), vehicle-to-everything (V2X) communications, non-terrestrial network (NTN) communications, short-range communications (e.g., Bluetooth), etc.

The first wireless device 102 may be emitting RF signals in proximity to a human 108, who may be the user of the first wireless device 102 and/or a bystander. As an example, the first wireless device 102 may be held in the hand of the human 108 and/or positioned against or near the head of the human 108. In certain cases, the first wireless device 102 may be positioned in a pocket or bag of the human 108. In some cases, the first wireless device 102 may be positioned proximate to the human 108 as a mobile hotspot. To ensure the human 108 is not overexposed to RF emissions from the first wireless device 102, the first wireless device 102 may control the transmit power associated with the RF signals in accordance with an RF exposure limit, as further described herein, where the RF exposure limit may depend on corresponding exposure scenario (e.g., head exposure, extremity (e.g., hand) exposure, body (body-worn) exposure, hotspot exposure, etc.). Extremities may include, for example, hands, wrists, feet, ankles, and pinnae.

The first wireless device 102 may include any of various wireless communication devices including a user equipment (UE), a wireless station, an access point, a customer-premises equipment (CPE), etc. In certain aspects, the first wireless device 102 includes an RF exposure manager 106 that provides certain transmission information to a satellite communications application in order to enhance the user experience associated with the communications application, in accordance with aspects of the present disclosure.

The second wireless devices 104*a-f* may include, for example, a base station 104*a*, an aircraft 104*b*, a satellite 104*c*, a vehicle 104*d*, an access point (AP) 104*e*, and/or a UE 104*f*. Further, the wireless communication system 100 may include terrestrial aspects, such as ground-based network entities (e.g., the base station 104*a* and/or access point 104*e*), and/or non-terrestrial aspects, such as the aircraft 104*b* and the satellite 104*c*, which may include network entities on-board (e.g., one or more base stations) capable of communicating with other network elements (e.g., terrestrial base stations) and/or user equipment.

The base station 104*a* may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. The base station 104*a* may provide communications coverage for a respective geographic coverage area, which may sometimes be referred to as a cell, and which may overlap in some cases (e.g., a small cell may have a coverage area that overlaps the coverage area of a macro cell). A base station may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

The first wireless device 102 and/or the UE 104*f* may generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. A UE may also be referred to more generally as a mobile device, a wireless device, a wireless communications device, a wireless station (STA), a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and other terms.

In certain cases, the first wireless device 102 may control the transmit power used to emit RF signals in compliance with an RF exposure limit. RF exposure may be expressed in terms of a specific absorption rate (SAR), which measures energy absorption by human tissue per unit mass and may have units of watts per kilogram (W/kg). RF exposure may also be expressed in terms of power density (PD), which measures energy absorption per unit area and may have units of milliwatts per square centimeter ($mW/cm^2$). In some cases, the RF exposure limit may be expressed as a specific energy absorption (SA) limit or an absorbed energy density (Uab) limit. In certain cases, a maximum permissible exposure (MPE) limit in terms of PD may be imposed for wireless communication devices using transmission frequencies above 6 GHz. Frequency bands of 24 GHz to 71 GHz or greater are sometimes referred to as "millimeter wave" ("mmW" or "mmWave"). The MPE limit is a regulatory metric for exposure based on area, e.g., an energy density limit defined as a number, X, watts per square meter ($W/m^2$) averaged over a defined area and time-averaged over a frequency-dependent time window in order to prevent a human exposure hazard represented by a tissue temperature change. Certain RF exposure limits may be specified based on a maximum RF exposure metric (e.g., SAR or PD) averaged over a specified time window (e.g., 100 or 360 seconds for sub-6 GHz frequency bands or 2 seconds for 60 GHz bands).

SAR may be used to assess RF exposure for transmission frequencies less than 6 GHz, which cover wireless communication technologies such as 2G/3G (e.g., CDMA), 4G (e.g., E-UTRA), 5G (e.g., NR in sub-6 GHz bands), IEEE 802.11 (e.g., a/b/g/n/ac), etc. PD may be used to assess RF exposure for transmission frequencies higher than 6 GHz, which cover wireless communication technologies such as IEEE 802.11ad, 802.11ay, 5G in mmWave bands, etc. Thus, different metrics may be used to assess RF exposure for different wireless communication technologies.

A wireless device (e.g., the first wireless device 102) may be capable of transmitting signals using multiple wireless communication technologies and/or frequency bands, and in some cases, capable of simultaneous transmission of such signals. For example, the wireless device may transmit signals using a first wireless communication technology operating at or below 6 GHz (e.g., 3G, 4G, 5G, 802.11a/b/g/n/ac, etc.) and a second wireless communication technology operating above 6 GHz (e.g., mmWave 5G in 24 to 60 GHz bands, IEEE 802.11ad or 802.11ay). In certain aspects, the wireless device may transmit signals using the first wireless communication technology (e.g., 3G, 4G, 5G in sub-6 GHz bands, IEEE 802.11ac, etc.) in which RF exposure may be measured in terms of SAR, and the second wireless communication technology (e.g., 5G in 24 to 71 GHz bands, IEEE 802.11ad, 802.11ay, etc.) in which RF exposure may be measured in terms of PD.

Figure 2:
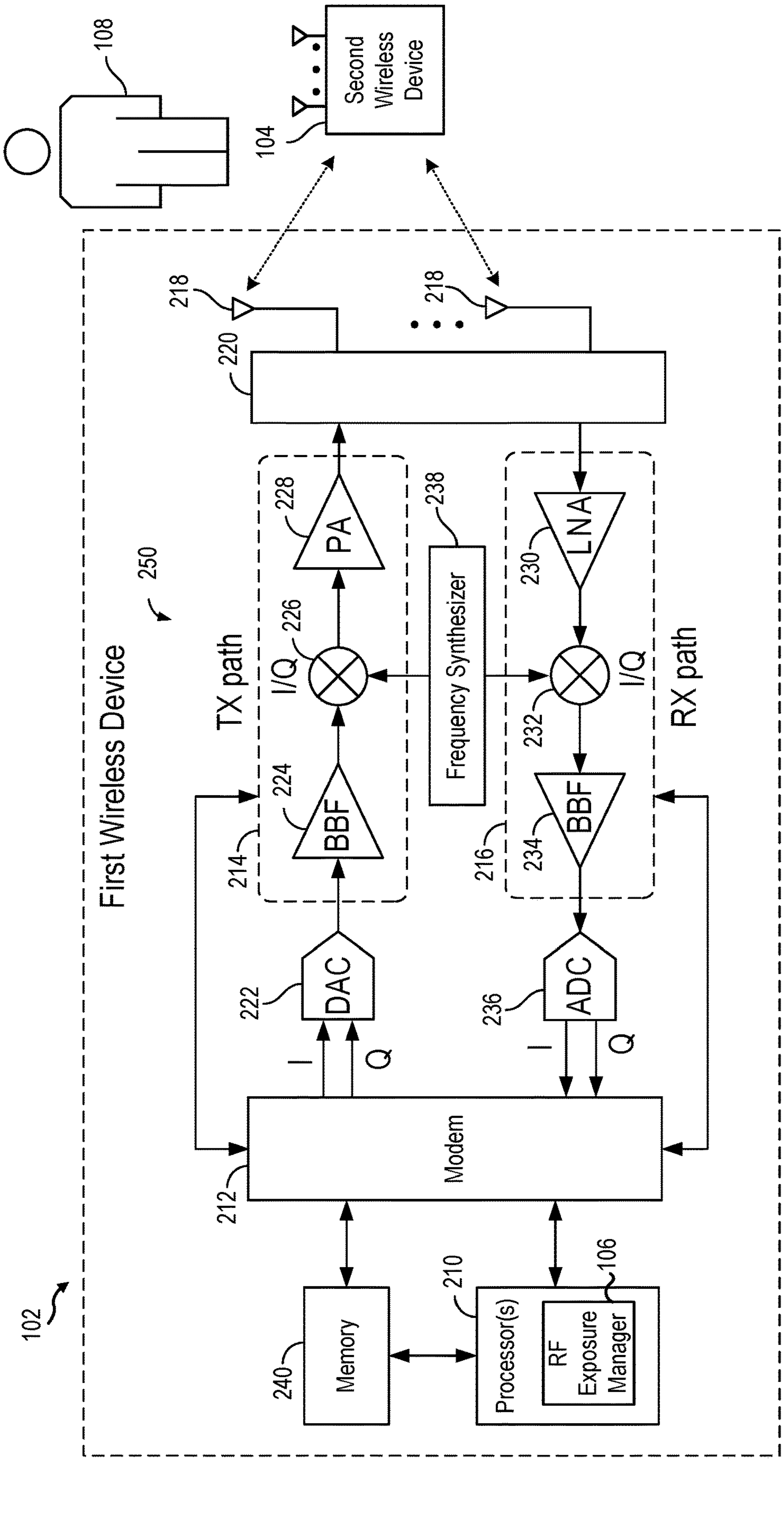
FIG. 2 is a block diagram conceptually illustrating a design of an example wireless communication device communicating with another device.

FIG. 2 illustrates example components of the first wireless device 102, which may be used to communicate with any of the second wireless devices 104, in some cases, in proximity to human tissue as represented by the human 108.

The first wireless device 102 may be, or may include, a chip, system on chip (SoC), chipset, package or device that includes one or more modems 212. In some cases, the modem(s) 212 may include, for example, any of a WWAN modem (e.g., a modem configured to communicate via E-UTRA and/or 5G NR standards), a WLAN modem (e.g., a modem configured to communicate via 802.11 standards), a Bluetooth modem, a NTN modem, etc. In certain aspects, the first wireless device 102 also includes one or more radios (collectively "the radio 250"). In some aspects, the first wireless device 102 further includes one or more processors, processing blocks or processing elements (collectively "the processor 210") and one or more memory blocks or elements (collectively "the memory 240").

In certain aspects, the processor 210 may include a processor representative of an application processor that generates information (e.g., application data such as content requests) for transmission and/or receives information (e.g., requested content) via the modem 212. In some cases, the processor 210 may include a microprocessor associated with the modem 212, which may implement the RF exposure manager 106 and/or process any of certain protocol stack layers associated with a radio access technology (RAT). For example, the processor 210 may process any of an application layer, packet layer, WLAN protocol stack layers (e.g., a link or medium access control (MAC) layer), and/or WWAN protocol stack layers (e.g., a radio resource control (RRC) layer, a packet data convergence protocol (PDCP) layer, a radio link control (RLC) layer, and a MAC layer). In some cases, at least one of the modems 212 (e.g., the WWAN modem) may be in communication with one or more of the other modems 212 (e.g., the WLAN modem and/or Bluetooth modem). For example, the processor 210 may be representative of at least one of the modems 212 in communication with one or more of the other modems 212.

The modem 212 may generally be configured to implement a physical (PHY) layer. For example, the modem 212 may be configured to modulate packets and to output the modulated packets to the radio 250 for transmission over a wireless medium. The modem 212 is similarly configured to obtain modulated packets received by the radio 250 and to demodulate the packets to provide demodulated packets. In addition to a modulator and a demodulator, the modem 212 may further include digital signal processing (DSP) circuitry, automatic gain control (AGC), a coder, a decoder, a multiplexer and a demultiplexer (not shown).

As an example, while in a transmission mode, the modem 212 may obtain data from the processor 210. The data obtained from the processor 210 may be provided to a coder, which encodes the data to provide encoded bits. The encoded bits may be mapped to points in a modulation constellation (e.g., using a selected modulation and coding scheme) to provide modulated symbols. The modulated symbols may be mapped, for example, to spatial stream(s) or space-time streams. The modulated symbols may be multiplexed, transformed via an inverse fast Fourier transform (IFFT) block, and subsequently provided to DSP circuitry for transmit windowing and filtering. The digital signals may be provided to a digital-to-analog converter (DAC) 222. In certain aspects involving beamforming, the modulated symbols in the respective spatial streams may be precoded via a steering matrix prior to provision to the IFFT block.

The modem 212 may be coupled to the radio 250 including a transmit (TX) path 214 (also known as a transmit chain) for transmitting signals via one or more antennas 218 and a receive (RX) path 216 (also known as a receive chain) for receiving signals via the antennas 218. When the TX path 214 and the RX path 216 share an antenna 218, the paths may be connected with the antenna via an interface 220, which may include any of various suitable RF devices, such as a switch, a duplexer, a diplexer, a multiplexer, and the like. As an example, the modem 212 may output digital in-phase (I) and/or quadrature (Q) baseband signals representative of the respective symbols to the DAC 222.

Receiving I or Q baseband analog signals from the DAC 222, the TX path 214 may include a baseband filter (BBF) 224, a mixer 226 (which may include one or several mixers), and a power amplifier (PA) 228. The BBF 224 filters the baseband signals received from the DAC 222, and the mixer 226 mixes the filtered baseband signals with a transmit local oscillator (LO) signal to convert the baseband signal to a different frequency (e.g., upconvert from baseband to a radio frequency). In some aspects, the frequency conversion process produces the sum and difference frequencies between the LO frequency and the frequencies of the baseband signal. The sum and difference frequencies are referred to as the beat frequencies. Some beat frequencies are in the RF range, such that the signals output by the mixer 314 are typically RF signals, which may be amplified by the PA 228 before transmission by the antenna 218. The antennas 218 may emit RF signals, which may be received at the second wireless device 104. While one mixer 226 is illustrated, several mixers may be used to upconvert the filtered baseband signals to one or more intermediate frequencies and to thereafter upconvert the intermediate frequency signals to a frequency for transmission.

The RX path 216 may include a low noise amplifier (LNA) 230, a mixer 232 (which may include one or several mixers), and a baseband filter (BBF) 234. RF signals received via the antenna 218 (e.g., from the second wireless device 104) may be amplified by the LNA 230, and the mixer 232 mixes the amplified RF signals with a receive local oscillator (LO) signal to convert the RF signal to a baseband frequency (e.g., downconvert). The baseband signals output by the mixer 232 may be filtered by the BBF 234 before being converted by an analog-to-digital converter (ADC) 236 to digital I or Q signals for digital signal processing. The modem 212 may receive the digital I or Q signals and further process the digital signals, for example, demodulating the digital signals.

Certain transceivers may employ frequency synthesizers with a voltage-controlled oscillator (VCO) to generate a stable, tunable LO frequency with a particular tuning range. Thus, the transmit LO frequency may be produced by a frequency synthesizer 238, which may be buffered or amplified by an amplifier (not shown) before being mixed with the baseband signals in the mixer 226. Similarly, the receive LO frequency may be produced by the frequency synthesizer 238, which may be buffered or amplified by an amplifier (not shown) before being mixed with the RF signals in the mixer 232. Separate frequency synthesizers may be used for the TX path 214 and the RX path 216.

While in a reception mode, the modem 212 may obtain digitally converted signals via the ADC 236 and RX path 216. As an example, in the modem 212, digital signals may be provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may be fed to the AGC, which is configured to use information extracted from the digital signals, for example, in one or more received training fields, to determine an appropriate gain. The output of the DSP circuitry also may be coupled with the demodulator, which is configured to extract modulated symbols from the signal and, for example, compute the logarithm likelihood ratios (LLRs) for each bit position of each subcarrier in each spatial stream. The demodulator may be coupled with the decoder, which may be configured to process the LLRs to provide decoded bits. The decoded bits from all of the spatial streams may be fed to the demultiplexer for demultiplexing. The demultiplexed bits may be descrambled and provided to a MAC layer (e.g., the processor 210) for processing, evaluation, or interpretation.

The processor 210 and/or modem 212 may control the transmission of signals via the TX path 214 and/or reception of signals via the RX path 216. In some aspects, the processor 210 and/or modem 212 may be configured to perform various operations, such as those associated with any of the methods described herein. The processor 210 and/or the modem 212 may include a microcontroller, a microprocessor, an application processor, a baseband processor, a MAC processor, a neural network processor, a digital signal processor (DSP), an application specific integrated circuit (ASIC), a field programmable gate array (FPGA) or other programmable logic device (PLD), discrete gate or transistor logic, discrete hardware components, or any combination thereof. In some cases, aspects of the processor 210 may be integrated with (incorporated in and/or shared with) the modem 212, such as the RF exposure manager 106, a microcontroller, a microprocessor, a baseband processor, a medium access control (MAC) processor, a digital signal processor, etc. For example, the processor 210 may be representative of a co-processor (e.g., a microprocessor) associated with the modem 212, and the modem 212 may be representative of an ASIC including the baseband processor, MAC processor, DSP, and/or neural network processor. The memory 240 may store data and program codes (e.g., computer-readable instructions) for performing wireless communications as described herein. The memory 240 may be external to the processor 210 and/or the modem 212 (as illustrated) and/or incorporated therein. In certain cases, the RF exposure manager 106 (as implemented via the processor 210 and/or modem 212) may determine a transmit power (e.g., corresponding to certain levels of gain(s) applied to the TX path 214 including the BBF 224, the mixer 226, and/or the PA 228) that complies with an RF exposure limit set by country-specific regulations and/or international guidelines (e.g., International Commission on Non-Ionizing Radiation Protection (ICNIRP) guidelines) as described herein.

FIG. 2 shows an example transceiver design. It will be appreciated that other transceiver designs or architectures may be applied in connection with aspects of the present disclosure. For example, while examples discussed herein utilize I and Q signals (e.g., quadrature modulation), those of skill in the art will understand that components of the transceiver may be configured to utilize any other suitable modulation, such as polar modulation. As another example, circuit blocks may be arranged differently from the configuration shown in FIG. 2, and/or other circuit blocks not shown in FIG. 2 may be implemented in addition to or instead of the blocks depicted.

In certain cases, compliance with an RF exposure limit may be performed as a time-averaged RF exposure evaluation within a specified running (moving or rolling) time window associated with the RF exposure limit. The RF exposure limit may specify a time-averaged RF exposure metric (e.g., SAR and/or PD) over the running time window. As an example, the Federal Communications Commission (FCC) specifies that certain SAR limits (general public exposure) are 0.08 W/kg, as averaged over the whole body, and a peak spatial-average SAR of 1.6 W/kg, averaged over any 1 gram of tissue (defined as a tissue volume in the shape of a cube) for sub-6 GHz bands, whereas certain PD limits are 1 $mW/cm^2$, as averaged over the whole body, and a peak spatial-average PD of 4 $mW/cm^2$, averaged over any 1 $cm^2$. The FCC also specifies the corresponding averaging time may be six minutes (360 seconds) for sub-6 GHz bands, whereas the averaging time may be 2 seconds for mmWave bands (e.g., 60 GHz frequency bands) under a proposed regulation, for example.

The RF exposure limit and/or corresponding averaging time window may vary based on the frequency band. In certain aspects, the RF exposure limit(s) and/or corresponding averaging time window(s), if applicable, may be specific to a particular geographic region or country, such as the United States, Canada, China, or European Union. In some cases, the RF exposure limit(s) may specify the maximum allowed RF exposure that can be encountered without time averaging. In such cases, the maximum allowed RF exposure may correspond to a maximum output or transmit power that can be used by the wireless device.

Figure 3:
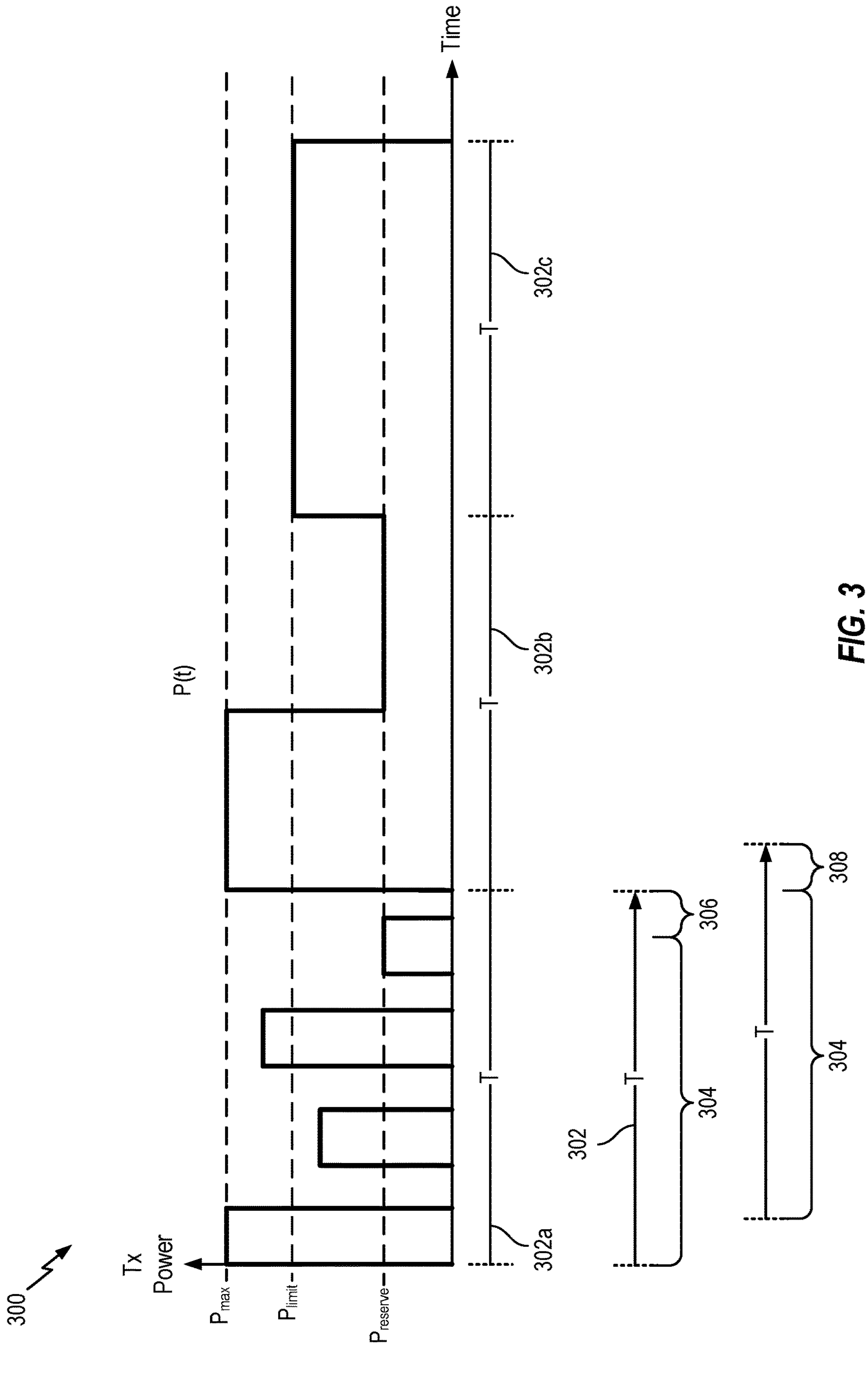
FIG. 3 is a graph illustrating examples of transmit powers over time in compliance with an RF exposure limit.

FIG. 3 is a graph 300 of a transmit power over time (P(t)) that varies over a running (e.g., rolling or moving) time window (T) associated with the RF exposure limit. The wireless device (e.g., the first wireless device 102) may evaluate RF exposure compliance over the running time window 302 (T) based on past RF exposure (e.g., a transmit power report) in a past time interval 304 of the time window 302 and a future time interval 306. The wireless device may determine the maximum allowed transmit power for the future time interval 306 that satisfies the time-averaged RF exposure limit based on the past RF exposure used in the past time interval 304. The wireless device may perform such a time-averaging evaluation as the time window 302 moves over time, for example, in the next future time interval 308, where the past time interval 304 now includes the previous future time interval 306.

The maximum time-averaged transmit power limit ($P_{limit}$) represents the maximum transmit power the wireless device can transmit continuously for the duration of the running time window 302 (T) in compliance with the RF exposure limit. For example, the wireless device is transmitting continuously at $P_{limit}$ in the third time window 302*c* such that the time-averaged transmit power over the time window (e.g., the third time window 302*c*) is equal to $P_{limit}$ in compliance with the time-averaged RF exposure limit.

In certain cases, an instantaneous transmit power may exceed $P_{limit}$ in certain transmission occasions, for example, as shown in the first time window 302*a* and the second time window 302*b*. In some cases, the wireless device may transmit at $P_{max}$, which may be the maximum instantaneous transmit power supported by the wireless device, the maximum instantaneous transmit power the wireless device is capable of outputting, or the maximum instantaneous transmit power allowed by a standard or regulatory body (e.g., the maximum output power, $P_{CMAX}$). In some cases, the wireless device may transmit at a transmit power less than or equal to $P_{limit}$ in certain transmission occasions, for example, as shown in the first time window 302*a*.

In certain cases, a reserve power may be used to enable a continuous transmission within a time window (T) when transmitting above $P_{limit}$ in the time window or to enable a certain level of quality for certain transmissions. As shown in the second time window 302*b*, the transmit power may be backed off from $P_{max}$ to a reserve power ($P_{reserve}$) so that the wireless device can maintain a continuous transmission during the time window (e.g., maintain a radio connection with a receiving entity) in compliance with the time-averaged RF exposure limit. In the third time window 302*c*, the wireless device may increase the transmit power to $P_{limit}$ in compliance with the time-averaged RF exposure limit. In some cases, $P_{reserve}$ may allow for a certain level of transmission quality for certain transmissions (e.g., control signaling, high priority communications, low latency communications, highly reliable communications, etc.). $P_{reserve}$ may be used to reserve transmit power for at least a portion of the time window 302 for certain transmissions (e.g., control signaling).

In the second time window 302*b*, the area between $P_{max}$ and $P_{reserve}$ for the time duration of transmitting at $P_m$ax may be equal to the area between $P_{limit}$ and $P_{reserve}$ for the time window T, such that the total area of transmit power (P(t)) in the second time window 302*b* is equal to the area of $P_{limit}$ for the time window T. Such an area may be considered using 100% of the energy (transmit power or exposure) to remain compliant with the time-averaged RF exposure limit. Without the reserve power $P_{reserve}$, the transmitter may transmit at $P_{max}$ for a portion of the time window with the transmitter turned off for the remainder of the time window to ensure compliance with the time-averaged RF exposure limit.

In some aspects, the wireless device may transmit at a power that is higher than $P_{limit}$, but less than $P_{max}$ in the time-average mode illustrated in the second time window 302*b*. While a single transmit burst is illustrated in the second time window 302*b*, it will be understood that the wireless device may instead utilize a plurality of transmit bursts within the time window (T), where the transmit bursts are separated by periods during which the transmit power is maintained at or below $P_{reserve}$. Further, it will be understood that the transmit power of each transmit burst may vary (either within the burst and/or in comparison to other bursts), and that at least a portion of the burst may be transmitted at a power above $P_{limit}$.

In certain aspects, the wireless device may transmit at a power less than or equal to a fixed power limit (e.g., $P_{limit}$) without considering past exposure and/or past transmit powers in terms of a time-averaged RF exposure. For example, the wireless device may transmit at a power less than or equal to $P_{limit}$ using a look-up table (comprising one or more values of $P_{limit}$ depending on an RF exposure scenario). The look-up table may provide one or more values of $P_{limit}$ depending on the transmit frequency, transmit antenna, radio configuration (single-radio or multi-radio) and/or RF exposure scenario (e.g., a device state index corresponding to head exposure, body or torso exposure, extremity or hand exposure, and/or hotspot exposure) encountered by the wireless device. Examples of RF exposure scenarios include cases where the wireless device is emitting RF signals proximate to human tissue, such as a user's head, hand, or body (e.g., torso), or where the wireless device is being used as a hotspot away from human tissue. Therefore, the RF exposure can be managed as a time-averaged RF exposure evaluation (e.g., illustrated in FIG. 3), managed using a look-up table or flat or maximum value, or using another strategy or algorithm, where a particular process of managing the RF exposure may be referred to herein as an RF exposure control scheme.

For certain aspects, a wireless device may exhibit or be configured with a transmission duty cycle. The wireless device may determine transmit power level(s) and/or reserve power level(s) in compliance with the time-averaged RF exposure limit based on the duty cycle. The transmission duty cycle may be indicative of a share (e.g., 100 ms) of a specific period (e.g., 500 ms) in which the wireless device transmits RF signals. The duty cycle may be a ratio of the share to the specific period (e.g., 100 ms/500 ms), where the duty cycle may be represented as a number from zero to one. The duty cycle may be an effective duty cycle associated with a total transmit time of one or more transmissions in the time period, where the one or more transmissions may include bursts of transmissions having a gap of time positioned between at least two of the bursts. For example, in the first time window 302*a*, the duty cycle may be greater than 50% of the duration of the time window (T), whereas in the second time window 302*b*, the duty cycle may be equal to 100% of the duration of the time window (T). In certain cases, the duty cycle may be standardized (e.g., predetermined) with a specific RAT and/or vary over time, for example, due to changes in radio conditions, mobility, and/or user behavior.

As an example, certain RATs may specify the uplink duty cycle in the form of a time division duplexing (TDD) configuration, such as a TDD uplink-downlink (UL-DL) slot pattern in 5G NR or similar TDD patterns in E-UTRA or UMTS. In 5G NR, the TDD UL-DL slot pattern may specify the number of uplink slots and corresponding position in time associated with the uplink slots in a sequence of slots, such that the total number of uplink slots with respect to the total number of slots in the sequence is indicative of the duty cycle. In certain aspects, the duty cycle may correspond to the actual duration for past transmissions scheduled or used, for example, within the TDD UL-DL slot pattern. For example, although the wireless device may be configured with a TDD UL-DL slot pattern, the wireless device may use a portion or subset of the UL slots for transmitting RF signals. Thus, the duty cycle for the wireless device may be less than the maximum available duty cycle corresponding to the TDD UL-DL slot pattern.

Figure 4:
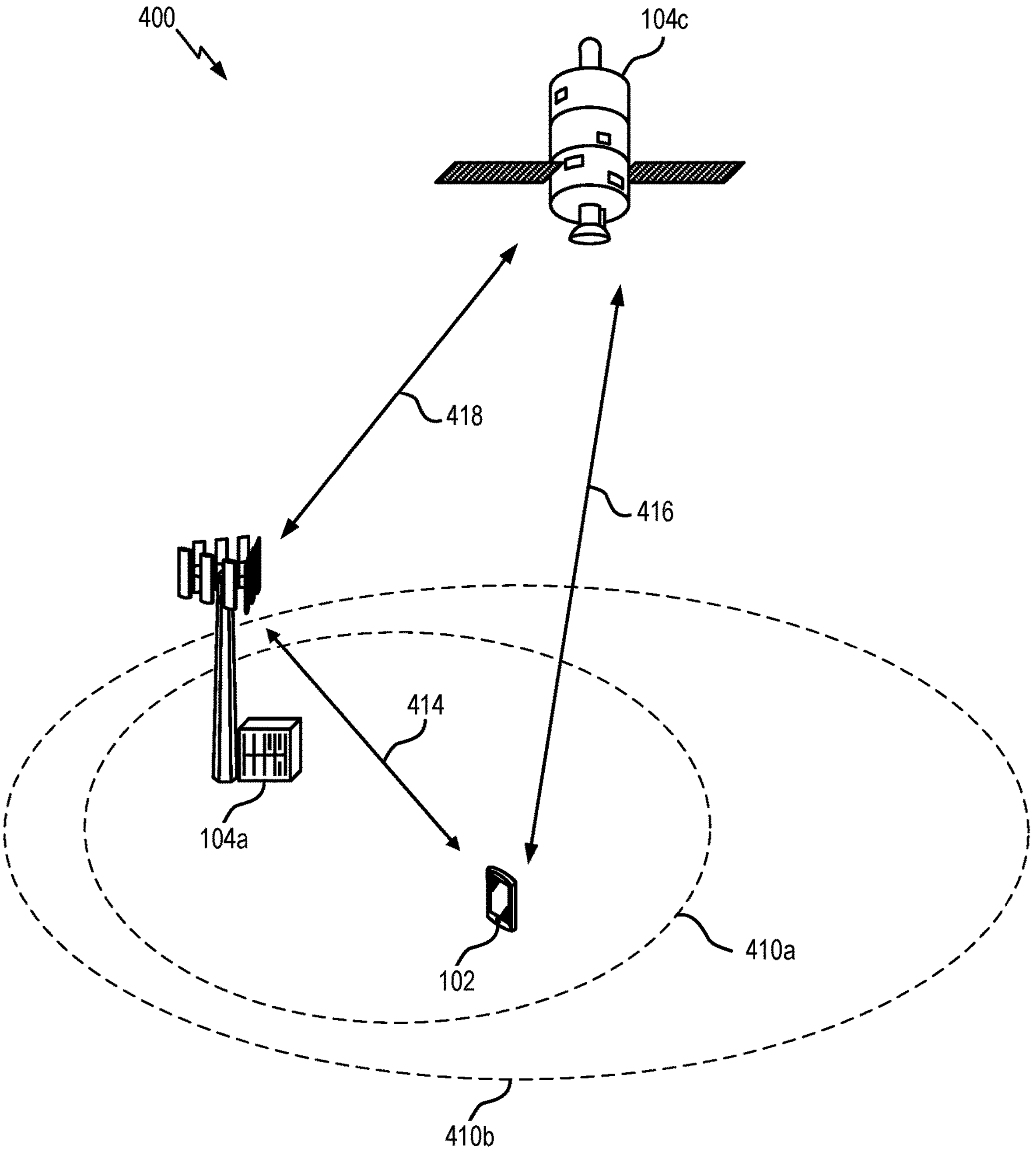
FIG. 4 illustrates an example of a wireless communication system employing a non-terrestrial network (NTN).

FIG. 4 illustrates an example of a wireless communication system 400 employing a non-terrestrial network (NTN), for example, as a satellite 104*c* corresponding to the second wireless device. In some examples, the wireless communication system 400 may implement aspects of the wireless communication system 100. The wireless communication system 400 may include the first wireless device 102 (for simplicity depicted as a portable wireless communication device such as a UE) and the second wireless devices 104*a*, 104*c* (hereinafter, in this example, the base station (BS) 104*a* and the satellite 104*c*, respectively). In this example, the base station 104*a* may serve a coverage area or cell 410*a* in cases of a terrestrial network, and the satellite 104*c* may serve the coverage area 410*b* in cases of an NTN. In some aspects, the satellite 104*c* may be representative of a satellite in the Iridium or Globalstar satellite constellation, for example. Some NTNs may employ airborne platforms (e.g., an aircraft, a drone, or a balloon) and/or spaceborne platforms (e.g., a satellite) to facilitate NTN communications. A spaceborne platform may include any of various types of satellites, including, for example, a low Earth orbit satellite, a medium Earth orbit satellite, a geostationary orbit satellite, and/or a sun-synchronous orbit satellite. For ease of understanding, some of the examples described herein may be focused on NTN communications being implemented at least via a satellite, which should be understood to merely represent an example of an NTN entity. Other suitable NTN entities may be used for NTN communications.

The satellite 104*c* may communicate with the BS 104*a* and the first wireless device 102 as part of wireless communications in an NTN. In cases of a terrestrial network, the first wireless device 102 may communicate with the BS 104*a* over a communication link 414. In the case of NTN wireless communications, the satellite 104*c* may be a serving cell for the first wireless device 102 via a communication link 416. In certain aspects, the satellite 104*c* may act as a relay (or a remote radio head) for the BS 104*a* and the first wireless device 102. For example, the BS 104*a* may communicate with the satellite 104*c* via a communication link 418, and the satellite 104*c* may relay signaling between the BS 104*a* and the first wireless device 102 via the communication links 416, 418.

As a transmission from the first wireless device 102 to the satellite 104*c* may use a relatively high transmit power (e.g., a transmit power that is greater than $P_{limit}$) in order to provide a suitable transmission range to the satellite 104*c*, the RF exposure budget may be exhausted by the transmission to the satellite, and in some cases, by a single transmission (or portion thereof) to the satellite. In certain cases, the first wireless device 102 may force a user to wait before sending another text message in order to obtain enough RF exposure budget for a transmission to be in compliance with an RF exposure limit. In some cases, the first wireless device 102 may set a character limit for the text message due to the RF exposure budget only supporting a transmission with the respective character limit in order to be in compliance with the RF exposure limit. For example, the first wireless device 102 may not allow the user to send the complete text of a text message and/or force the user to reduce the characters in the text message. Suppose, for example, the available RF exposure budget is low (e.g., only enough for a short text message), and a user writes a long text message, the first wireless device 102 may transmit a partial text message and quickly exhaust the RF exposure budget, forcing the user to wait until there is enough RF exposure budget to transmit the complete text message. Thus, the user experience for satellite text messaging and/or other communications that use relatively high transmit powers (e.g., other types of non-terrestrial network (NTN) communications, transmissions at a cell's edge, etc.) may be frustrated due to the RF exposure limit. Further, if messaging is not appropriately managed, attempts to transmit a message that exhaust the RF exposure budget may prevent the complete message from being received by the satellite.

Example RF-Exposure-Aware NTN Communications

Aspects of the present disclosure provide apparatus and methods for enhancing NTN communications. Some examples include providing a satellite communications application with information derived from an RF exposure evaluation. A wireless device may determine the current RF exposure budget for future transmission(s) based on transmit power(s) associated with past transmission(s) in a time-averaging time window. The RF exposure budget may indicate the maximum transmit power and/or maximum transmit duration for one or more signals that the wireless device can transmit and remain in compliance with an RF exposure limit. The wireless device may convert the RF exposure budget to information that can enhance the user experience, the information including, for example, a maximum payload size (e.g., a character limit for a potential text message transmission) and/or a wait time to transmit the corresponding payload (e.g., the wait time may correspond to the seconds until a text message transmission can be sent). The wireless device may display the information in the satellite communications application to facilitate an enhanced user experience. For example, in response to seeing a long wait time, the user may reduce the size of a text message in order to facilitate no wait time or a shorter wait time to send the text. In certain aspects, the wireless device may dynamically update the information in response to the rolling nature of the RF exposure budget and how the user adjusts the payload (e.g., increasing or decreasing the length of a text message, cropping the size and/or reducing the quality of an image, etc.).

The apparatus and methods for enhancing NTN communications described herein may provide various advantages. As an example, apparatus and methods described herein may allow for efficient and reliable management (e.g., transmission) of communications in an NTN system. As an example, apparatus and methods described herein may provide a user with information that can allow the user to determine whether to send a short text message (or a smaller payload) immediately or after a short duration or send a longer text message (or a larger payload) after a long duration. Such information as displayed in a satellite communications application may enhance the user experience for a user.

Figure 5:
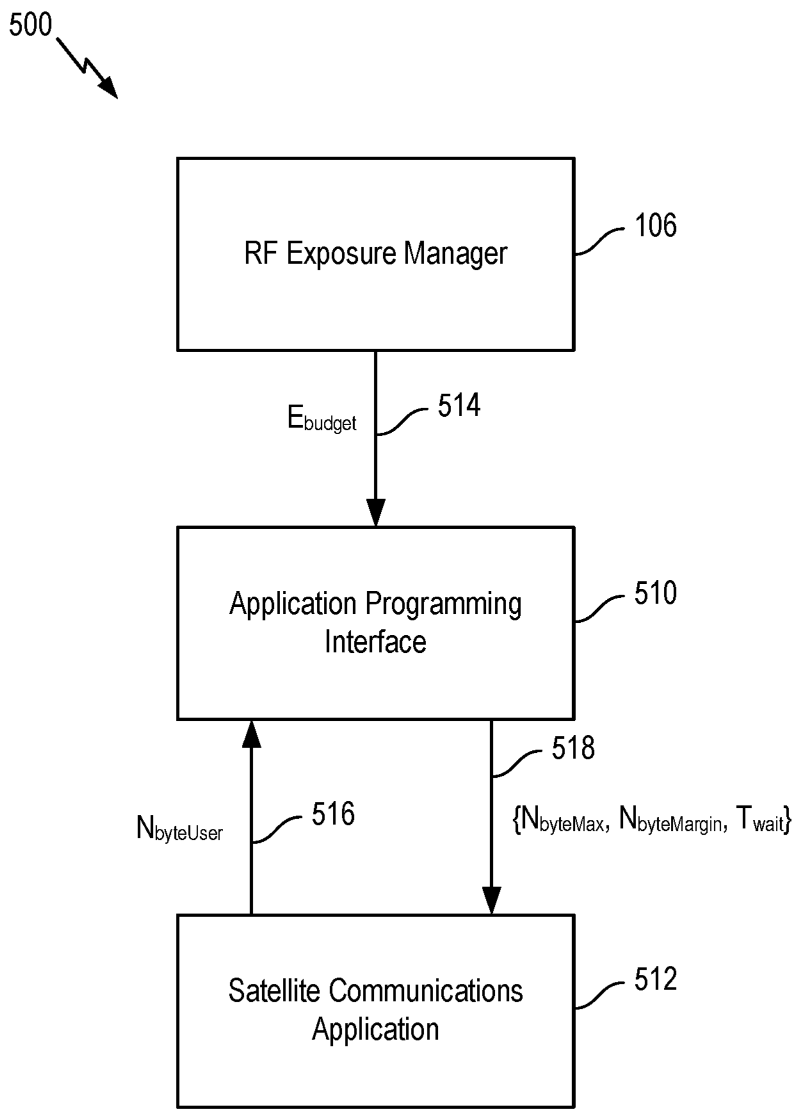
FIG. 5 is a diagram illustrating a logical architecture for providing certain information derived from an RF exposure evaluation to a satellite communications application.

FIG. 5 is a diagram illustrating a logical architecture 500 for providing certain information derived from an RF exposure evaluation to a satellite communications application. The architecture 500 may include, for example, the RF exposure manager 106, an application programming interface (API) 510, and a satellite communications application 512. In some aspects, the architecture 500 may be implemented as software components (e.g., computer-readable instructions) that are executed on one or more processors (e.g., the processor 210 and/or the modem 212) of a wireless device (e.g., the first wireless device 102) to cause the wireless device to perform any of the operations performed by the architecture 500 as further described herein. In some examples, the API 510 is implemented in the modem 212, and the application 512 is implemented in an applications processor (e.g., the processor 210).

The RF exposure manager 106 may control the transmit power (and hence, the RF exposure) associated with one or more radios (e.g., the radio 250) of a wireless device (e.g., the first wireless device 102). As an example, the RF exposure manager 106 may operate as a centralized and/or standalone controller for determining maximum allowed transmit power(s) that can be used by one or more radios in a future time interval based on past transmit powers. These past transmit powers may have been used by the one or more radios in a time-averaging time window in compliance with an RF exposure limit, for example, as described herein with respect to FIG. 3. The RF exposure manager 106 may track the transmit power(s) associated with one or more transmissions across the time-averaging time window and determine the available RF exposure budget 514 (e.g., $E_{budget}$) for future transmission(s) in compliance with an RF exposure limit (e.g., $P_{limit}$). The RF exposure budget may correspond to a transmit power budget, which may indicate the maximum allowed transmit power that one or more radio(s) can use for one or more future time intervals in compliance with an RF exposure limit, which may be a time-averaged RF exposure limit and/or a total energy limit.

The API 510 may provide an interface to facilitate communications between the RF exposure manager 106 and the satellite communications application 512. For example, in a software stack, the RF exposure manager 106 may operate at and/or control a physical layer associated with a modem and/or transceiver, and the satellite communications application 512 may operate in a user space, for example, associated with an interactive graphical user environment (and/or an interactive audio environment and/or an interactive tactile environment for accessibility) as an application for Windows®, macOS®, Unix®, Linux®, Android®, iOS®, etc. The API 510 may obtain the RF exposure budget 514 from the RF exposure manager 106 and optionally a payload size 516 (e.g., labeled "$N_{byteUser}$" for number of bytes entered by the user) for a potential transmission from the satellite communications application 512. The API 510 may determine transmission information 518 for the satellite communications application based at least in part on the RF exposure budget 514 and optionally the payload size 516. As an example, the transmission information 518 may include information relevant to the transmission of a payload in a potential transmission and derived from at least the RF exposure budget 514. The transmission information 518 may include a maximum allowed payload size (labeled "$N_{byteMax}$" for maximum number of bytes allowed) for the potential transmission, a payload margin size (labeled "$N_{byteMargin}$" for number of bytes of the margin) for the potential transmission, and/or a wait time ($T_{wait}$) to transmit the potential transmission.

The API 510 may convert the RF exposure budget to the maximum allowed payload size ($N_{byteMax}$), for example, based at least in part on a transmit power for the potential transmission, a transmit antenna input power limit (e.g., the maximum transmit power that a transmitter is capable of outputting via a particular antenna or antenna array), a satellite communication time-division multiplexing (TDM) pattern, etc. In certain aspects, the maximum allowed payload size may be a dynamic value that varies over time due to the past transmission history in a time-averaging time window, a time-averaged RF exposure limit, the transmission duty cycle, etc. In certain aspects, the maximum allowed payload size may correspond to the transmit power budget available in the next transmission occasion associated with a TDM pattern, for example. The wireless device may update the maximum allowed payload size on a periodic basis, for example, every 1 second, 5 seconds, 10 seconds, etc. The payload margin may represent or indicate the size associated with any spare payload that can be transmitted in compliance with the RF exposure budget. The API 510 may determine the payload margin size according to the following:

$$N_{byteMargin} = \max(0, N_{byteMax} - N_{byteUser})$$

where $N_{byteMargin}$ may be the larger value among a default value (e.g., 0) and the difference between the maximum allowed payload size and the payload size of the potential transmission (e.g., as entered by the user). In some examples, the satellite communications application 512 (e.g., instead of the API 510) calculates the margin based on user input and the maximum allowed payload size.

If the size of the payload (e.g., the user payload size, $N_{byteUser}$) is greater than the maximum allowed payload size (e.g., $(N_{byteMax}-N_{byteUser})\leq 0$), the API 510 may determine the wait time ($T_{wait}$) to transmit the payload. In some cases, the wait time ($T_{wait}$) may be determined based on the past RF exposure history, for example, in a time-averaging time window. The wait time ($T_{wait}$) may allow the user to determine whether to wait to send the payload as is or adjust the size of the payload (e.g., increasing or decreasing the character count of a text message) to facilitate no wait time or a shorter wait time, for example. If the size of the payload is less than or equal to the maximum allowed payload size (e.g., $(N_{byteMax}-N_{byteUser})>0$), there may be effectively no wait time to send the payload, and $T_{wait}$ may be set to a particular value, for example, zero. With a wait time of zero, the user may choose to send the payload immediately as indicated by the wait time. The payload size 516 may indicate the size of a payload for the potential transmission, for example. As an example, the payload may include a text message, location data, a chat communication, an email, or any suitable media content; and the payload size 516 and/or the maximum allowed payload size may indicate or include a number of bytes, a number of characters, etc. associated with the payload. In some examples, the wait time may be determined as a specific amount of time (e.g., as measured in seconds). In other examples, the wait time is determined and/or presented to the user as merely an indication of whether a wait will be required or not. Such determination and/or presentation may be performed by the satellite communications application 512 instead of the API 510 in some aspects. In some examples, a rough estimated wait time is determined and/or presented by the satellite communications application 512 (for example, to the nearest several seconds, or in blocks of 5 or 10 seconds) instead of being calculated to an approximately exact amount of time.

The satellite communications application 512 may be or include an application that allows a user to communicate and/or transfer content via satellite communications. As an example, the satellite communications application 512 may include a satellite text messaging application, an email client, a file transfer application, a social media application, etc. The satellite communications application 512 may obtain the transmission information 518 and allow a user to access the transmission information 518. For example, the satellite communications application 512 may display an indication of some or all of the transmission information 518 on an electronic display or screen, including, for example, a liquid crystal display (LCD), an organic light-emitting diode (OLED) screen, an electronic ink (e-ink) display, etc. of the wireless device. In some cases, the satellite communications application 512 may output audio that describes the transmission information 518 and/or may output the transmission information 518 as Braille, for example, via a Braille terminal. In some examples, the satellite communications application 512 is an emergency services application or is configured to transmit emergency service messages (e.g., e911 or private emergency services).

In some examples, the API 510 is omitted. For example, the RF exposure manager 106 and the satellite communications application 512 may be integrated or in direct communication. In such examples, the RF exposure manager 106 or the satellite communications application 512 may calculate the maximum allowed payload size, wait time, etc. based on the RF exposure budget. In some examples, both the RF exposure manager 106 and the satellite communications application 512 are implemented in an applications processor (e.g., the processor 210).

Figure 6:
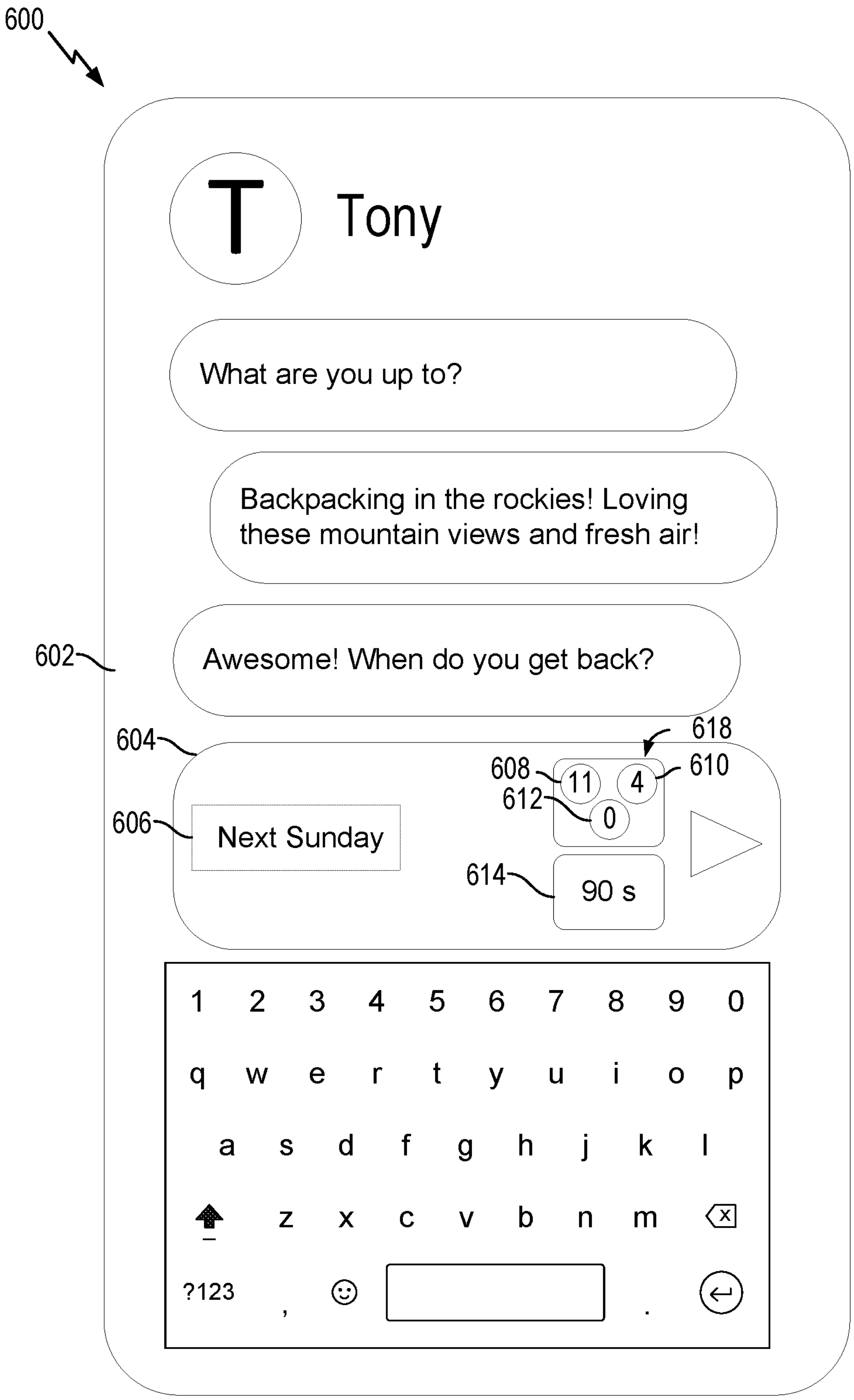
FIG. 6 is a diagram illustrating an example user interface associated with a satellite messaging application.

FIG. 6 is a diagram illustrating an example user interface 600 associated with a satellite messaging application. In this example, the satellite messaging application may be running on a portable communication device, such as a satellite phone, a smartphone, a laptop computer, a tablet computer, etc. The user interface 600 may be displayed via a screen 602 or any other suitable electronic display device. The user interface 600 may depict the transmission information 618 (e.g., which may be an example of some or all of the transmission information 518) derived from the RF exposure budget as described herein with respect to FIG. 5. The user interface 600 may provide a snapshot of the messaging application at a particular time or instant. The messaging application may update the content of the user interface 600 at periodic time intervals (e.g., every 500 milliseconds, 1 seconds, 5 seconds, etc., which may or may not align with how often the budget 514 is provided to or retrieved by the API 510 and/or how often the transmission information 518 is provided to or retrieved by the satellite communications application 512) and/or in response to certain event(s), such as detecting an update to the content of the payload. For example, the messaging application may update the transmission information 618 in response to the user making a change to the content of the draft text message.

As shown, the user interface 600 may include, for example, a text editing box 604, a draft text message 606 in the text editing box 604, and transmission information 618. The transmission information 618 may include a payload size 608 (e.g., 11 characters), a maximum allowed payload size 610 (e.g., 4 characters), a payload margin size 612 (e.g., 0 characters due to the payload size being greater than the maximum allowed payload size), and/or a wait time 614 (e.g., ninety seconds). The payload margin size may indicate the remaining characters that can be added to the text message without having to wait to transmit the text message. In this example, due to the payload size 608 exceeding the maximum allowed payload size 610, the payload margin size 612 may indicate that zero characters can be added to the payload. The wait time may allow the user to understand the duration of time that will lapse until a potential transmission at the current payload size 608 can be transmitted. The wait time of ninety seconds may be due to the past transmission history associated with the wireless device and/or the next transmission occasion that is available for satellite communications (e.g., in a TDM pattern).

Suppose the user takes notice of the wait time and the maximum allowed payload size, and the user reduces the payload size to be within the maximum allowed payload size (e.g., the draft text message is updated to say "7/1" representing the date the user plans to return home from backpacking), the messaging application may update the wait time to a shorter duration (e.g., a wait time of zero seconds). The user may see this information and understand that the text message can be sent immediately, allowing the user to send a text message sooner than previously expected. Such information may enhance the user experience to inform the user of when a text message can be sent or how to adjust a text message to reduce or increase the wait time. It will be appreciated that the transmission information described herein may be applied to any communication application and/or file transfer application, such as an email client, social media application, a file transfer or synchronization application, etc. Further, it will be appreciated that a subset of the transmission information may be presented to the user, and that the user interface 600 is an example only. Other formats, types, and/or amounts of information may be displayed to the user. In one such example, the wait time 614 is not determined and/or displayed; it may be understood by the user that transmissions having more information (e.g., characters) than the maximum allowed payload size 610 will require a wait or delay before transmission.

Figure 7:
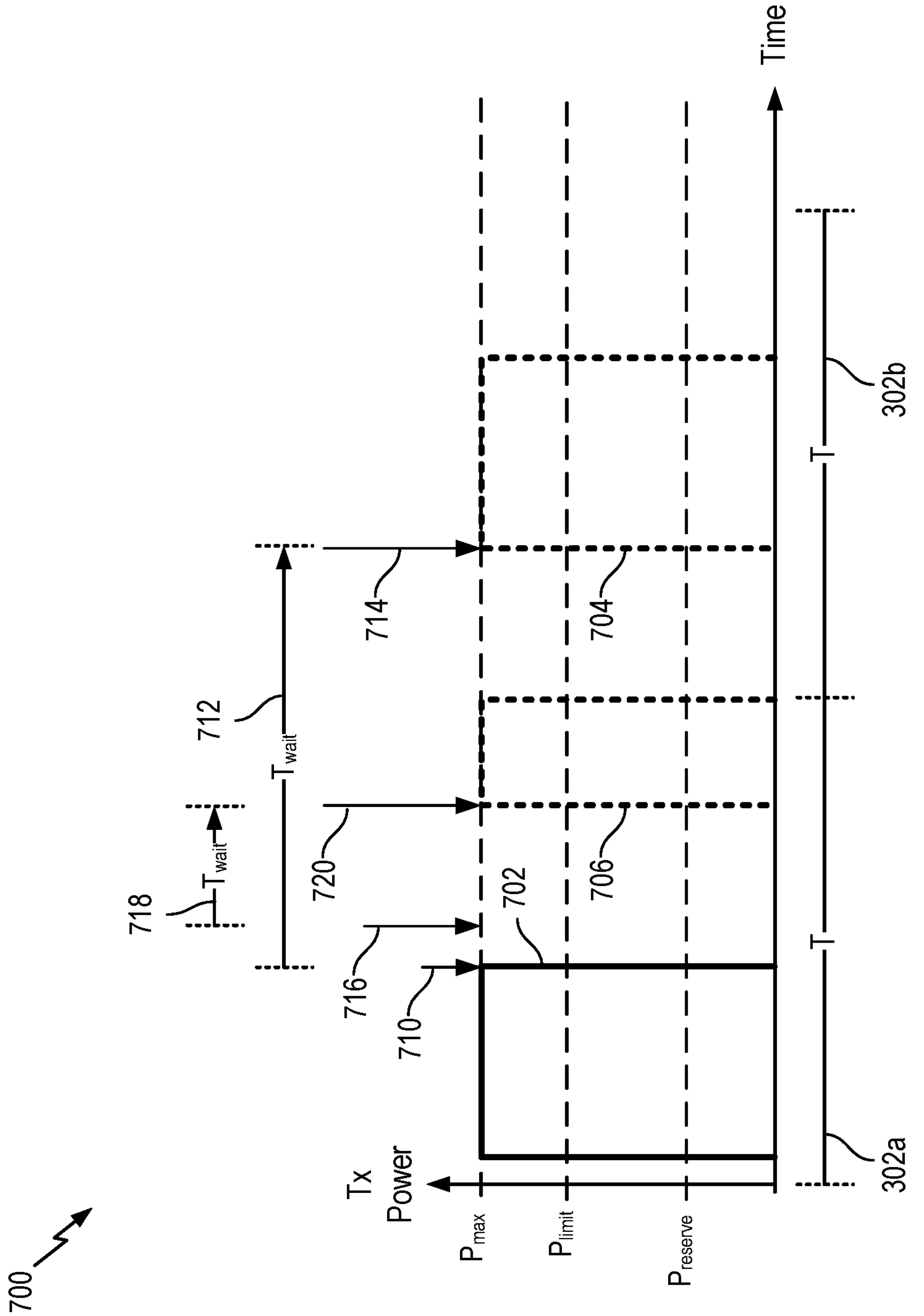
FIG. 7 is a graph of transmit power over time illustrating potential transmissions and corresponding wait times with respect to a satellite communications application.

FIG. 7 is a graph 700 of transmit power over time illustrating potential transmissions and corresponding wait times with respect to a satellite communications application. In this example, the wireless device may have transmitted a first payload corresponding to a first transmit power pulse 702. At a first time 710, the user may have typed a first text message (e.g., the draft text message 606) having a first size. In response to the text message input, the wireless device may determine the transmission information associated with the first text message, for example, as described herein with respect to FIG. 5. Due to the past transmit power history (e.g., in a rolling time window), the first text message may require a first wait time 712 (e.g., 90 seconds) to lapse to facilitate transmission of the first text message (corresponding to a second transmit power pulse 704) that starts at a second time 714. The first wait time 712 may correspond to the time period that spans from the first time 710 to the second time 714. With access to the first wait time 712, the user may adjust (e.g., reduce), at a third time 716, the size of the text message to generate a second text message having a second size that is less than the first size. In response to the updated text message, the wireless device may determine updated transmission information associated with the second text message, for example, as described herein with respect to FIG. 5. Here too, due to the past transmit power history (e.g., in the rolling time window), the second text message may require a second wait time 718 (e.g., 15 seconds) to lapse to facilitate transmission of the second text message (corresponding to a third transmit power pulse 706) that starts at a fourth time 720. The second wait time 718 may correspond to the time period that spans from the third time 716 to the fourth time 720. As demonstrated in these examples, the transmission information (e.g., the wait time) may enhance the user experience allowing the user to adjust communications, which may facilitate shorter wait times for satellite communications. In configurations where the messages are related to emergency services, understanding a time required to transmit a message and/or being able to adjust a message to reduce a wait time may increase the safety of a user.

It will be appreciated that the transmit power pulses depicted in FIG. 7 are simplified examples. The transmit power signature of a transmission may vary over time, for example, as multiple pulses spaced over time, as multiple retransmissions, etc.

Figure 8:
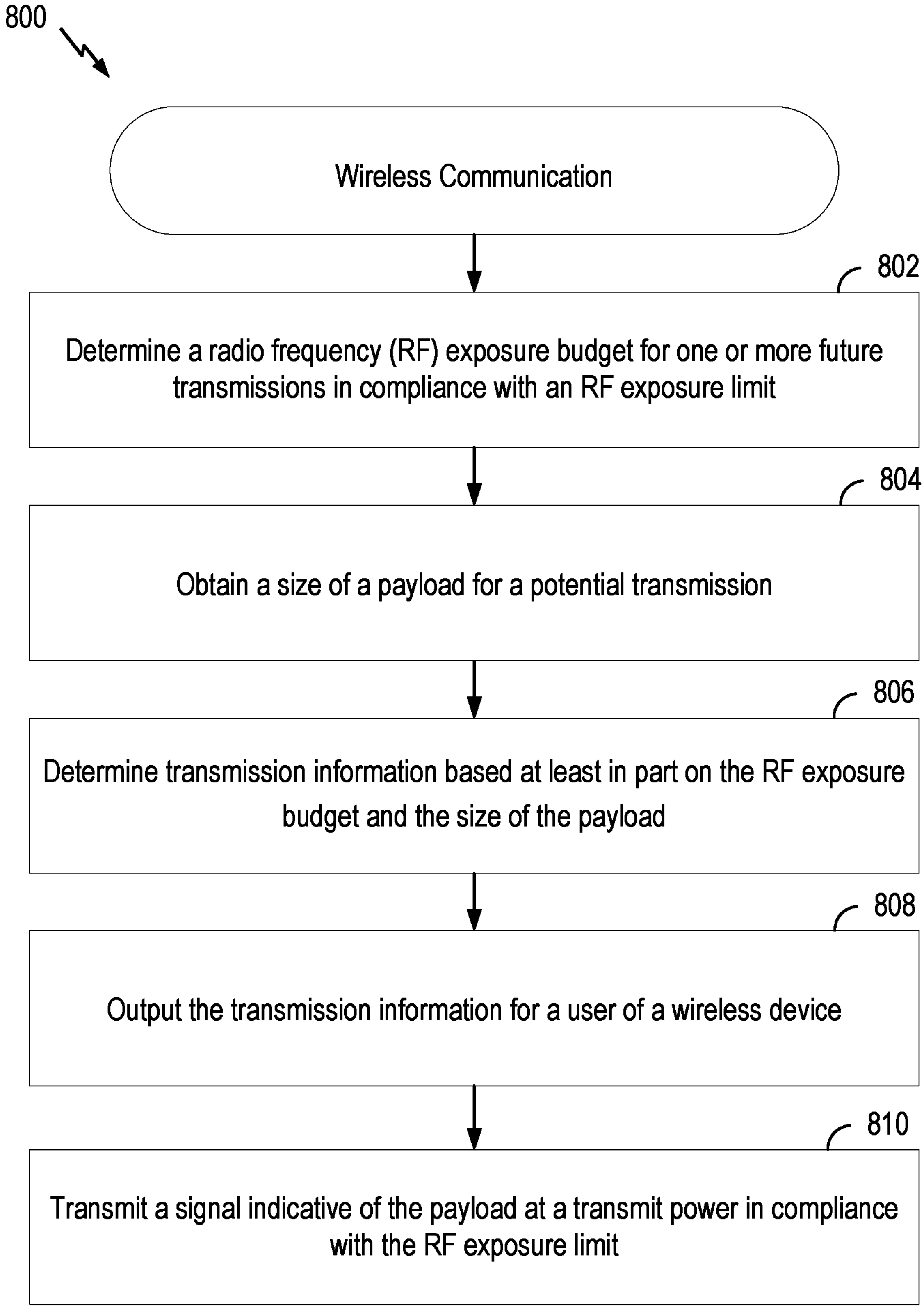
FIG. 8 is a flow diagram illustrating example operations for wireless communication by a wireless device.

FIG. 8 is a flow diagram illustrating example operations 800 for wireless communication. The operations 800 may be performed, for example, by a wireless device (e.g., the first wireless device 102 in the wireless communication system 100). The operations 800 may be implemented as software components that are executed and run on one or more processors (e.g., the processor 210 and/or the modem 212 of FIG. 2). Further, the transmission and/or reception of signals by the wireless device in the operations 800 may be enabled, for example, by one or more antennas (e.g., antennas 218 of FIG. 2). In certain aspects, the transmission and/or reception of signals by the wireless device may be implemented via a bus interface of one or more processors (e.g., the processor 210 and/or the modem 212) obtaining and/or outputting signals for reception or transmission.

The operations 800 may optionally begin, at block 802, where the wireless device may determine an RF exposure budget (e.g., the RF exposure budget 514) for one or more future transmissions (e.g., corresponding to the second transmit power pulse 704) in compliance with an RF exposure limit (e.g., a time-averaged RF exposure limit or a total energy limit). For example, the RF exposure may indicate the maximum transmit power that the wireless device can transmit for a certain time period, such as a time period within a time-averaging time window associated with a time-averaged RF exposure limit or a time window associated with a total energy limit. In some cases, the wireless device may determine a transmit power budget that corresponds to an RF exposure budget, for example, due to a transmit power being proportional to an RF exposure level.

At block 804, the wireless device may optionally obtain a size of a payload (e.g., the payload size 516) for a potential transmission. As an example, the payload may include a text message, an email, an image, audio content (e.g., an audio recording), a video, location data, a document, media content (including social media content), or any combination thereof. The size of the payload may be in terms of a unit of digital information (e.g., as a number of bytes), the number of characters, or a combination thereof. The payload size may be obtained, for example, by the API 510 from the satellite communications application 512, and/or block 804 may include the satellite communications application 512 obtaining the size based on user input.

At block 806, the wireless device may determine transmission information (e.g., the transmission information 518, 618) based at least in part on the RF exposure budget and optionally the size of the payload. The transmission information may include information derived from at least the RF exposure budget. As an example, the transmission information may include at least one of a maximum allowed size of the payload (e.g., the maximum allowed payload size 610) for the potential transmission, a payload margin size (e.g., the payload margin size 612), and/or a wait time (e.g., the wait time 614) associated with the potential transmission.

At block 808, the wireless device may output the transmission information for a user of a wireless device. As an example, to output the transmission information, the wireless device may display an indication of at least a portion of the transmission information, for example, as described herein with respect to FIG. 6. In certain aspects, the wireless device may output any of various means of accessibility for the transmission information. In some cases, the wireless device may output audio describing the transmission information as an example means of accessibility. The wireless device may output the transmission information in the form of Braille as another example means of accessibility.

At block 810, the wireless device may transmit a signal indicative of the payload at a transmit power in compliance with the RF exposure limit. For example, the wireless device may transmit the signal to another wireless communication device (e.g., the satellite 104*c* depicted in FIG. 1). The signal may indicate (or carry) any of various information, such as data and/or control information. In some cases, the signal may indicate (or carry) one or more packets or data blocks. In certain cases, the wireless device may transmit the signal via NTN communications. As an example, the wireless device may transmit the signal to an NTN entity, such as a satellite in the Iridium constellation. The transmission may be based on a user input, for example a user confirming that he or she would like to send the payload from block 804 and/or revising the payload subsequent to output or presentation of the transmission information at block 808.

In certain aspects, the wireless device may determine the wait time based on the past transmission history, the RF exposure limit, the potential transmission, and/or a determined, selected, or certain transmit power. As an example, the wait time may correspond to the potential transmission occurring immediately or occurring within a processing time for the potential transmission, in response to the size of the payload being less than or equal to the maximum allowed size of the payload. Such a wait time may indicate to a user that the potential transmission can be sent immediately or within the respective processing time, which may be considered by a user as an immediate response. The processing time may correspond to a time period from when a user application triggers a modem to transmit the payload to when a transmitter transmits a signal indicative of the payload. In some cases, the wait time may correspond to a particular duration (e.g., 1 to 100 seconds) in response to the size of the payload being greater than the maximum allowed size of the payload. The wait time may correspond to a duration of time from a reference time (e.g., the first time 710) to when there is sufficient transmit power in the RF exposure budget to transmit the payload in compliance with the RF exposure limit (e.g., at the second time 714). The reference time may correspond to a time at which the size of the payload was obtained or generated. In some cases, the reference time may correspond to a periodic time reading that obtains the present time or current time.

The maximum allowed size of the payload may correspond to a payload size associated with a signal being transmitted at a transmit power for a particular duration in compliance with the RF exposure limit. The transmit power may be greater than a maximum time-averaged transmit power level ($P_{limit}$) corresponding to the RF exposure limit. Such transmit power may be determined a priori (e.g., transmissions for a given satellite system or constellation are associated with a predetermined transmit power, or transmit power for all NTN or satellite communications are at a maximum (e.g., $P_{max}$ or $P_{CMAX}$)), or may be determined or selected dynamically (e.g., based on a signal strength, etc.). The maximum allowed size of the payload, the payload margin size, and/or the wait time (as described above) may be based on a setting or assumption that the transmit power will be maintained approximately constant for the duration of the transmission of the payload or constant during times allowed by a TDM pattern, for example without the transmit power being reduced to a reserve power or otherwise below $P_{limit}$. In some examples, the wireless device is configured to determine the maximum allowed size of the payload, the payload margin size, and/or the wait time, based on the entire payload being transmitted at a constant maximum power, as illustrated in FIG. 7. The maximum allowed size may include a maximum allowed number of bytes, a maximum allowed number of characters, maximum allowed number of words (e.g., based on a defined number of characters or bytes for the average word size), or a combination thereof. The payload margin size may correspond to a size associated with any spare payload available for the potential transmission.

In certain aspects, the transmission information may be enabled or available for transmissions that use a relatively high transmit power for transmission (e.g., a transmit power greater than $P_{limit}$). As an example, the potential transmission may be for NTN communications and/or a transmission at the edge of a cell. Such a transmission may use a transmit power that is greater than $P_{limit}$, and thus, the transmission may not be able to be transmitted immediately and/or for a continuous duration due to an RF exposure limit. The potential transmission may correspond to transmitting a signal at a transmit power greater than a maximum time-averaged power level (e.g., $P_{limit}$) for a particular duration.

In some cases, the user may update the content of the payload, for example, in response to the transmission information. The user may adjust the size of the payload for the potential transmission. The wireless device may determine updated transmission information based at least in part on the RF exposure budget (which may be updated) and the adjusted size of the payload. The wireless device may output the updated transmission information for the user, for example, by displaying the transmission information in a messaging application.

As an example, the payload may include a text message in a text messaging application, and the wireless device may display the transmission information in the text messaging application. The text messaging application may include a satellite text messaging application.

In certain aspects, the wireless device may update the transmission information periodically and/or in response to certain event(s). For example, the wireless device may repeat obtaining the size of the payload (e.g., at block 804) and determining the transmission information (e.g., at block 806) at a periodic time interval (e.g., 500 milliseconds, 1 second, or 5 seconds).

In some examples, the transmission information is not presented to a user. For example, in some configurations, the block 808 is omitted or skipped. For example, the wireless device may automatically transmit the signal at block 810 in response to a determination or assessment based on the information determined at block 806. As an example, in some systems, communications (e.g., text messages transmitted to a satellite) cannot be partitioned into multiple parts. In such systems, the wireless device may be configured to determine a wait time associated with a user message, and then automatically defer sending the message until the wait time has elapsed. As another example, in systems in which communications can be partitioned into multiple parts, the wireless device may be configured to determine a size of communication that can be transmitted without waiting and to split a user message into a portion that is transmitted immediately and a portion that is transmitted later. In either system, a wireless device may be configured to translate an exposure budget into a message size or amount of data (e.g., bytes) available for transmission and/or an amount of time during which such message or data may be transmitted. The data (e.g., image, file, location data, etc.) or message may be user-defined (e.g., not known to the wireless device beforehand). Thus, the wireless device may appropriately communicate messages that were not previously defined in an NTN system.

Example Communications Device

Figure 9:
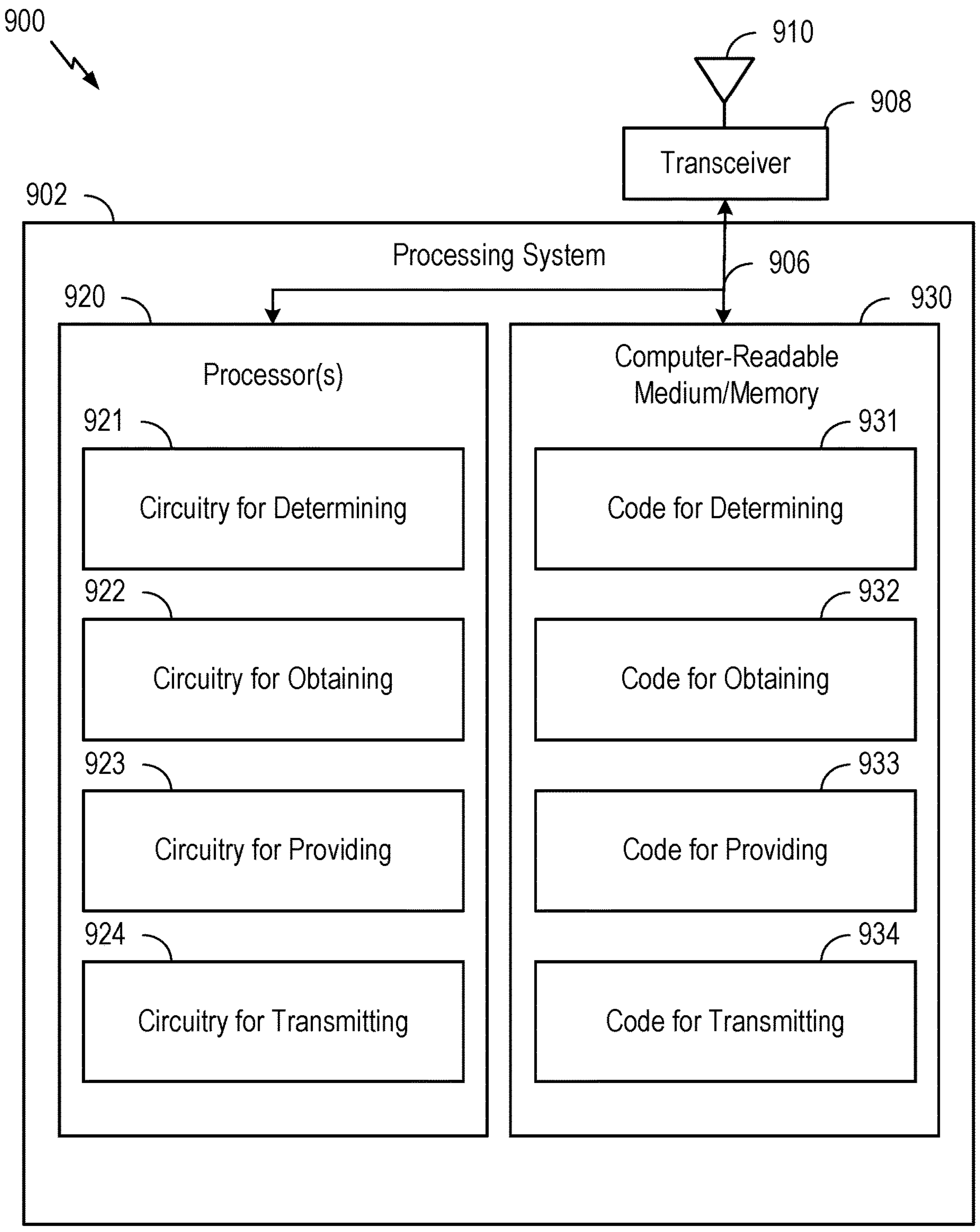
FIG. 9 illustrates a communications device that may include various components configured to perform operations for the techniques disclosed herein.

FIG. 9 depicts aspects of an example communications device 900. In some aspects, communications device 900 is a wireless communication device, such as the first wireless device 102 described above with respect to FIGS. 1 and 2.

The communications device 900 includes a processing system 902 coupled to a transceiver 908 (e.g., a transmitter and/or a receiver). The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes one or more processors 920. In various aspects, the one or more processors 920 may be representative of any of the processor 210 and/or the modem 212, as described with respect to FIG. 2. The one or more processors 920 are coupled to a computer-readable medium/memory 930 via a bus 906. In certain aspects, the computer-readable medium/memory 930 is configured to store instructions (e.g., computer-executable code) that when executed by the one or more processors 920, cause the one or more processors 920 to perform the operations 800 described with respect to FIG. 8, or any aspect related to the operations described herein. Note that reference to a processor performing a function of communications device 900 may include one or more processors performing that function of communications device 900. Reference to one or more processors performing multiple functions may include any one of the one or more processors performing any one of the multiple functions.

In the depicted example, computer-readable medium/memory 930 stores code (e.g., executable instructions) for determining 931, optionally code for obtaining 932, optionally code for providing (e.g., displaying, outputting audio, or outputting tactile information) 933, code for transmitting 934, or any combination thereof. Processing of the code 931-934 may cause the communications device 900 to perform the operations 800 described with respect to FIG. 8, or any aspect related to operations described herein.

The one or more processors 920 include circuitry configured to implement (e.g., execute) the code stored in the computer-readable medium/memory 930, including circuitry for determining 921, optionally circuitry for obtaining 922, optionally circuitry for providing 923, circuitry for transmitting 924, or any combination thereof. Processing with circuitry 921-924 may cause the communications device 900 to perform the operations 800 described with respect to FIG. 8, or any aspect related to operations described herein.

Various components of the communications device 900 may provide means for performing the operations 800 described with respect to FIG. 8, or any aspect related to operations described herein. For example, means for transmitting, sending or outputting for transmission may include the TX path 214 and/or antenna(s) 218 of the first wireless device 102 illustrated in FIG. 2 and/or transceiver 908 and antenna 910 of the communications device 900 in FIG. 9. Means for receiving or obtaining may include the RX path 216 and/or antenna(s) 218 of the first wireless device illustrated in FIG. 2 and/or transceiver 908 and antenna 910 of the communications device 900 in FIG. 9. Means for determining, means for obtaining, means for providing, and/or means for transmitting may include one or more processors, such as the processor 210 and/or modem 212 depicted in FIG. 2 and/or the processor(s) 920 in FIG. 9.

Example Aspects

Implementation examples are described in the following numbered clauses:

Aspect 1: A method of wireless communication by a wireless device, comprising: determining a radio frequency (RF) exposure budget for one or more future transmissions in compliance with an RF exposure limit; obtaining a size of a payload for a potential transmission; determining transmission information based at least in part on the RF exposure budget and the size of the payload; and outputting the transmission information for a user of the wireless device.

Aspect 2: The method of Aspect 1, wherein: the transmission information includes at least one of a maximum allowed size of the payload for the potential transmission, a payload margin size, or a wait time associated with the potential transmission; and outputting the transmission information includes displaying the transmission information.

Aspect 3: The method of Aspect 2, wherein the wait time corresponds to the potential transmission occurring immediately or occurring within a processing time for the potential transmission, in response to the size of the payload being less than or equal to the maximum allowed size of the payload.

Aspect 4: The method of Aspect 2, wherein the wait time corresponds to a particular duration in response to the size of the payload being greater than the maximum allowed size of the payload.

Aspect 5: The method of Aspect 2, wherein the wait time corresponds to a duration of time from a reference time to when there is sufficient transmit power in the RF exposure budget to transmit the payload in compliance with the RF exposure limit.

Aspect 6: The method of Aspect 5, wherein the reference time corresponds to a time at which the size of the payload was obtained.

Aspect 7: The method of any of Aspects 2 to 6, wherein the maximum allowed size comprises a maximum allowed number of bytes, a maximum allowed number of characters, maximum allowed number of words, or a combination thereof.

Aspect 8: The method of any of Aspects 2 to 6, wherein: the maximum allowed size of the payload corresponds to a payload size associated with a signal being transmitted at a transmit power for a particular duration in compliance with the RF exposure limit; and the payload margin size corresponds to a size associated with any spare payload available for the potential transmission.

Aspect 9: The method of Aspect 8, wherein the transmit power is greater than a maximum time-averaged transmit power level corresponding to the RF exposure limit.

Aspect 10: The method of any of Aspects 1 to 9, wherein the payload comprises: a text message, an email, an image, a video, a document, social media content, or any combination thereof.

Aspect 11: The method of any of Aspects 1 to 10, further comprising: determining that the size of the payload for the potential transmission has been adjusted; determining updated transmission information based at least in part on the RF exposure budget and the adjusted size of the payload; and outputting the updated transmission information for the user.

Aspect 12: The method of any of Aspects 1 to 11, further comprising transmitting a signal indicative of the payload at a transmit power in compliance with the RF exposure limit.

Aspect 13: The method of Aspect 12, wherein transmitting the signal comprises transmitting the signal to a non-terrestrial network entity.

Aspect 14: The method of any of Aspects 1 to 9 and 11 to 13, wherein the payload comprises a text message in a text messaging application and wherein the outputting comprises displaying an indication of at least a portion of the transmission information in the text messaging application.

Aspect 15: The method of Aspect 14, wherein the text messaging application comprises a satellite text messaging application.

Aspect 16: The method of any of Aspects 1 to 15, wherein the potential transmission corresponds to transmitting a signal for all of the payload at a transmit power greater than a maximum time-averaged power level.

Aspect 17: The method of any of Aspects 1 to 16, further comprising repeating the obtaining the size of the payload and the determining the transmission information at a time interval.

Aspect 18: An apparatus for wireless communication, comprising: a memory; and one or more processors coupled to the memory, the one or more processors being configured to: determine a radio frequency (RF) exposure budget for one or more future transmissions in compliance with an RF exposure limit, obtain a size of a payload for a potential transmission, determine transmission information based at least in part on the RF exposure budget and the size of the payload, and output the transmission information for a user of the apparatus.

Aspect 19: The apparatus of Aspect 18, wherein the transmission information includes at least one of a maximum allowed size of the payload for the potential transmission, a payload margin size, or a wait time associated with the potential transmission.

Aspect 20: The apparatus of Aspect 19, wherein the wait time corresponds to the potential transmission occurring immediately or occurring within a processing time for the potential transmission, in response to the size of the payload being less than or equal to the maximum allowed size of the payload.

Aspect 21: The apparatus of Aspect 19, wherein the wait time corresponds to a particular duration in response to the size of the payload being greater than the maximum allowed size of the payload.

Aspect 22: The apparatus of Aspect 19, wherein the wait time corresponds to a duration of time from a reference time to when there is sufficient transmit power in the RF exposure budget to transmit the payload in compliance with the RF exposure limit and wherein the reference time corresponds to a time at which the size of the payload was obtained.

Aspect 23: The apparatus of any of Aspects 19 to 22, wherein: the maximum allowed size of the payload corresponds to a payload size associated with a signal being transmitted at a transmit power for a particular duration in compliance with the RF exposure limit; and the payload margin size corresponds to a size associated with any spare payload available for the potential transmission.

Aspect 24: The apparatus of Aspect 23, wherein the transmit power is greater than a maximum time-averaged transmit power level corresponding to the RF exposure limit.

Aspect 25: The apparatus of any of Aspects 18 to 24, wherein the one or more processors are further configured to: determine an adjusted size of the payload for the potential transmission; determine updated transmission information based at least in part on the RF exposure budget and the adjusted size of the payload; and output the updated transmission information for the user.

Aspect 26: The apparatus of any of Aspects 18 to 25, further comprising a transmitter configured to transmit a signal indicative of the payload at a transmit power in compliance with the RF exposure limit, wherein the transmitter is configured to transmit the signal to a non-terrestrial network entity.

Aspect 27: The apparatus of any of Aspects 18 to 26, wherein the one or more processors are further configured to repeat the obtaining the size of the payload and the determining the transmission information at a time interval.

Aspect 28: The apparatus of any of Aspects 18 to 27, further comprising a screen configured to display the transmission information for the user.

Aspect 29: The apparatus of any of Aspects 18 to 28, wherein the potential transmission corresponds to transmission of a signal at a transmit power greater than a maximum time-averaged power level for a particular duration.

Aspect 30: A non-transitory computer-readable medium storing code that, when executed by one or more processors of an apparatus, cause the apparatus to perform a method, the method comprising: determining a radio frequency (RF) exposure budget for one or more future transmissions in compliance with an RF exposure limit; obtaining a size of a payload for a potential transmission; determining transmission information based at least in part on the RF exposure budget and the size of the payload; and outputting the transmission information for a user of the apparatus.

Aspect 31: A method of wireless communication by a wireless device, comprising: determining a radio frequency (RF) exposure budget for one or more future transmissions in compliance with an RF exposure limit; determining transmission information based at least in part on the RF exposure budget and a transmit power greater than a maximum time-averaged power level; outputting the transmission information for a user of the wireless device; receiving input from the user in response to the outputting; and transmitting a signal indicative of the payload or an adjusted payload at the transmit power in compliance with the RF exposure limit.

Aspect 32: The method of Aspect 31, wherein transmitting the signal comprises transmitting the signal to a non-terrestrial network entity.

Aspect 33: The method of any of Aspects 31 to 32, wherein the payload comprises a text message in a text messaging application.

Aspect 34: The method of Aspect 33, wherein the text messaging application comprises a satellite text messaging application.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a microcontroller, a microprocessor, a general-purpose processor, a digital signal processor (DSP), a neural network processor, an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, identifying, mapping, applying, choosing, establishing, and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." The use of a definite article (e.g., "the" or "said") before an element is not intended to impart a singular meaning (e.g., "one and only one") on an otherwise plural meaning (e.g., "one or more") associated with the element unless specifically so stated. Unless specifically stated otherwise, the term "some" refers to one or more. No claim element is to be construed under the provisions of 35 U.S.C. § 112(f) unless the element is expressly recited using the phrase "means for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A method of wireless communication by a wireless device, comprising:

determining a radio frequency (RF) exposure budget for one or more future transmissions in compliance with an RF exposure limit;

obtaining a size of a payload for a potential transmission;

determining transmission information based at least in part on the RF exposure budget and the size of the payload, wherein the transmission information includes a maximum allowed size of the payload for the potential transmission or a payload margin size; and displaying, for a user of the wireless device, at least one of the maximum allowed size of the payload for the potential transmission or the payload margin size.

2. The method of claim 1, wherein:

the transmission information further includes a wait time associated with the potential transmission.

3. The method of claim 2, wherein the wait time corresponds to the potential transmission occurring immediately or occurring within a processing time for the potential transmission, in response to the size of the payload being less than or equal to the maximum allowed size of the payload.

4. The method of claim 2, wherein the wait time corresponds to a particular duration in response to the size of the payload being greater than the maximum allowed size of the payload.

5. The method of claim 2, wherein the wait time corresponds to a duration of time from a reference time to when there is sufficient transmit power in the RF exposure budget to transmit the payload in compliance with the RF exposure limit.

6. The method of claim 5, wherein the reference time corresponds to a time at which the size of the payload was obtained.

7. The method of claim 2, wherein the maximum allowed size comprises a maximum allowed number of bytes, a maximum allowed number of characters, maximum allowed number of words, or a combination thereof.

8. The method of claim 2, wherein:
- the maximum allowed size of the payload corresponds to a payload size associated with a signal being transmitted at a transmit power for a particular duration in compliance with the RF exposure limit; and
- the payload margin size corresponds to a size associated with any spare payload available for the potential transmission.

9. The method of claim 8, wherein the transmit power is greater than a maximum time-averaged transmit power level corresponding to the RF exposure limit.

10. The method of claim 1, wherein the payload comprises:
- a text message,
- an email,
- an image,
- a video,
- a document,
- social media content, or
- any combination thereof.

11. The method of claim 1, further comprising:
- determining that the size of the payload for the potential transmission has been adjusted;
- determining updated transmission information based at least in part on the RF exposure budget and the adjusted size of the payload, wherein the updated transmission information includes an updated maximum allowed size of the payload for the potential transmission or an updated payload margin size; and
- displaying, for the user of the wireless device, at least one of the updated maximum allowed size of the payload for the potential transmission or the updated payload margin size.

12. The method of claim 1, further comprising transmitting a signal indicative of the payload at a transmit power in compliance with the RF exposure limit.

13. The method of claim 12, wherein transmitting the signal comprises transmitting the signal to a non-terrestrial network entity.

14. The method of claim 1, wherein the payload comprises a text message in a text messaging application and wherein the displaying further comprises displaying, in the text messaging application, an indication of at least one of the maximum allowed size of the payload for the potential transmission or the payload margin size.

15. The method of claim 14, wherein the text messaging application comprises a satellite text messaging application.

16. The method of claim 1, wherein the potential transmission corresponds to transmitting a signal for all of the payload at a transmit power greater than a maximum time-averaged power level.

17. The method of claim 1, further comprising repeating the obtaining the size of the payload and the determining the transmission information at a time interval.

18. An apparatus for wireless communication, comprising:
- memory; and
- one or more processors coupled to the memory, the one or more processors being configured to:
  - determine a radio frequency (RF) exposure budget for one or more future transmissions in compliance with an RF exposure limit,
  - obtain a size of a payload for a potential transmission,
  - determine transmission information based at least in part on the RF exposure budget and the size of the payload, wherein the transmission information includes a maximum allowed size of the payload for the potential transmission or a payload margin size, and
  - display, for a user of the apparatus, at least one of the maximum allowed size of the payload for the potential transmission or the payload margin size.

19. The apparatus of claim 18, wherein the transmission information further includes a wait time associated with the potential transmission.

20. The apparatus of claim 19, wherein the wait time corresponds to the potential transmission occurring immediately or occurring within a processing time for the potential transmission, in response to the size of the payload being less than or equal to the maximum allowed size of the payload.

21. The apparatus of claim 19, wherein the wait time corresponds to a particular duration in response to the size of the payload being greater than the maximum allowed size of the payload.

22. The apparatus of claim 19, wherein the wait time corresponds to a duration of time from a reference time to when there is sufficient transmit power in the RF exposure budget to transmit the payload in compliance with the RF exposure limit and wherein the reference time corresponds to a time at which the size of the payload was obtained.

23. The apparatus of claim 19, wherein:
- the maximum allowed size of the payload corresponds to a payload size associated with a signal being transmitted at a transmit power for a particular duration in compliance with the RF exposure limit; and
- the payload margin size corresponds to a size associated with any spare payload available for the potential transmission.

24. The apparatus of claim 23, wherein the transmit power is greater than a maximum time-averaged transmit power level corresponding to the RF exposure limit.

25. The apparatus of claim 18, wherein the one or more processors are further configured to:
- determine an adjusted size of the payload for the potential transmission;
- determine updated transmission information based at least in part on the RF exposure budget and the adjusted size of the payload, wherein the updated transmission information includes an updated maximum allowed size of the payload for the potential transmission or an updated payload margin size; and
- display, for the user, at least one of the updated maximum allowed size of the payload for the potential transmission or the updated payload margin size.

26. The apparatus of claim 18, further comprising a transmitter configured to transmit a signal indicative of the payload at a transmit power in compliance with the RF exposure limit, wherein the transmitter is configured to transmit the signal to a non-terrestrial network entity.

27. The apparatus of claim 18, wherein the one or more processors are further configured to repeat the obtaining the size of the payload and the determining the transmission information at a time interval.

28. The apparatus of claim 18, further comprising a screen configured to display the transmission information for the user.

29. The apparatus of claim 18, wherein the potential transmission corresponds to transmission of a signal at a transmit power greater than a maximum time-averaged power level for a particular duration.

30. A non-transitory computer-readable medium storing code that, when executed by one or more processors of an apparatus, cause the apparatus to perform a method, the method comprising:

determining a radio frequency (RF) exposure budget for one or more future transmissions in compliance with an RF exposure limit;

obtaining a size of a payload for a potential transmission;

determining transmission information based at least in part on the RF exposure budget and the size of the payload, wherein the transmission information includes a maximum allowed size of the payload for the potential transmission or a payload margin size; and displaying, for a user of the apparatus, at least one of the maximum allowed size of the payload for the potential transmission or the payload margin size.

* * * * *